(12) United States Patent
Hammer et al.

(10) Patent No.: US 9,580,029 B2
(45) Date of Patent: Feb. 28, 2017

(54) BUMPER ASSEMBLIES INCLUDING A BUMPER COVER REINFORCEMENT AND VEHICLES INCORPORATING THE SAME

(71) Applicant: Toyota Motor Engineering & Manufacturing North America, Inc., Erlanger, KY (US)

(72) Inventors: Jeremiah Thomas Hammer, Ann Arbor, MI (US); Aaron Richard Steinhilb, Westland, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/731,612

(22) Filed: Jun. 5, 2015

(65) Prior Publication Data

US 2016/0355151 A1 Dec. 8, 2016

(51) Int. Cl.
*B60R 19/18* (2006.01)

(52) U.S. Cl.
CPC ...... *B60R 19/18* (2013.01); *B60R 2019/1806* (2013.01)

(58) Field of Classification Search
CPC .......... B60R 19/18; B60R 19/52; B60R 2019/1806; B60R 2019/525; B60R 2019/527
See application file for complete search history.

(56) References Cited

U.S. PATENT DOCUMENTS

| | | | |
|---|---|---|---|
| 6,290,272 B1 | 9/2001 | Braun | |
| 6,554,332 B1* | 4/2003 | Schuster | B60R 19/18 293/102 |
| 6,575,510 B2* | 6/2003 | Weissenborn | B60R 19/18 293/120 |
| 6,669,251 B2* | 12/2003 | Trappe | B60R 19/18 293/109 |
| 6,726,262 B2* | 4/2004 | Marijnissen | B60R 19/18 293/120 |
| 6,746,061 B1* | 6/2004 | Evans | B60R 19/18 293/120 |

(Continued)

FOREIGN PATENT DOCUMENTS

| | | |
|---|---|---|
| CN | 203920646 | 11/2014 |
| DE | 102005021724 | 11/2006 |

(Continued)

*Primary Examiner* — Glenn Dayoan
*Assistant Examiner* — Paul Chenevert
(74) *Attorney, Agent, or Firm* — Dinsmore & Shohl LLP

(57) ABSTRACT

A bumper assembly includes a bumper reinforcement beam, a bumper energy absorber member coupled to a face of the bumper reinforcement beam, and a bumper cover reinforcement coupled to the bumper reinforcement beam, the bumper cover reinforcement including a base portion and an outward extending portion extending outward of the base portion in a vehicle longitudinal direction to an end, the bumper cover support portion including a horizontally extending portion and a vertically extending portion, where the at least one of the horizontally extending portion decreases in dimension in the vehicle lateral direction and the vertically extending portion decreases in dimension in the vehicle vertical direction.

20 Claims, 13 Drawing Sheets

(56) References Cited

U.S. PATENT DOCUMENTS

| | | | |
|---|---|---|---|
| 6,997,490 B2 * | 2/2006 | Evans | B60R 19/18 |
| | | | 293/104 |
| 7,144,054 B2 | 12/2006 | Evans | |
| 7,144,055 B2 * | 12/2006 | Kimura | B60R 19/18 |
| | | | 293/133 |
| 7,163,243 B2 * | 1/2007 | Evans | B60R 19/12 |
| | | | 293/121 |
| 7,188,876 B2 * | 3/2007 | Jaarda | B60R 19/18 |
| | | | 293/121 |
| 7,740,293 B2 | 6/2010 | Kim | |
| 8,328,251 B2 * | 12/2012 | Nagwanshi | B60R 19/18 |
| | | | 293/120 |
| 8,348,313 B2 * | 1/2013 | Chickmenahalli | B60R 19/18 |
| | | | 293/120 |
| 8,480,143 B2 * | 7/2013 | Huang | B60R 19/04 |
| | | | 293/120 |
| 8,973,957 B2 * | 3/2015 | Corwin | B60R 21/34 |
| | | | 293/102 |
| 2007/0200376 A1 * | 8/2007 | Jaarda | B60R 19/18 |
| | | | 293/120 |
| 2010/0102580 A1 * | 4/2010 | Brooks | B60R 19/18 |
| | | | 293/133 |
| 2016/0200271 A1 * | 7/2016 | Steinhilb | B60R 19/18 |
| | | | 293/132 |

FOREIGN PATENT DOCUMENTS

| | | | | |
|---|---|---|---|---|
| DE | 102005027178 A1 * | 12/2006 | | B60R 19/18 |
| DE | 102012019380 A1 * | 4/2014 | | B60R 19/18 |
| FR | EP 1318323 A2 * | 6/2003 | | B60R 19/18 |
| FR | 2959465 A1 * | 11/2011 | | B60R 19/18 |
| JP | 2014104781 | 6/2014 | | |
| KR | 20130123198 | 11/2013 | | |

* cited by examiner

BUMPER ASSEMBLIES INCLUDING A BUMPER COVER REINFORCEMENT AND VEHICLES INCORPORATING THE SAME

TECHNICAL FIELD

The present specification generally relates to bumper assemblies and vehicles that include bumper assemblies, and more specifically, bumper assemblies that include a bumper cover reinforcement.

BACKGROUND

Vehicles may be equipped with bumper assemblies and impact protection structures that elastically and plastically deform to absorb energy in the event of an impact. A number of standards and tests currently exist, and various organizations are introducing a number of pedestrian regulations and rating criteria for automotive vehicles. As one example, test methods have been developed to assess the protection of an adult pedestrian by simulating leg-impact conditions during a car-to-pedestrian impact. Such criteria can affect the rigidity or feel of the bumper assemblies.

Accordingly, bumper assemblies are desired that allow for static subjective rigidity, particularly in the vertical direction, while maintaining pedestrian performance.

SUMMARY

In one embodiment, a bumper assembly includes a bumper reinforcement beam that extends in a vehicle lateral direction, and a bumper cover reinforcement coupled to the bumper reinforcement beam, the bumper cover reinforcement including a bumper cover support portion including a base portion coupled to the bumper reinforcement beam, and an outward extending portion extending outward from the base portion in the vehicle longitudinal direction to an end, the outward extending portion including a horizontally extending portion and a vertically extending portion extending in the vehicle vertical direction from the horizontally extending portion, where at least one of the horizontally extending portion decreases in dimension in the vehicle lateral direction along a length of the bumper cover support portion from the base portion to the end and the vertically extending portion decreases in dimension in the vehicle vertical direction along the length of the bumper cover support portion from the base portion to the end.

In another embodiment, a vehicle includes a bumper reinforcement beam that extends in a vehicle lateral direction, a bumper energy absorber member coupled to a face of the bumper reinforcement beam, the bumper energy absorber member including a base that extends laterally along a length of the bumper reinforcement beam and energy absorbing lobes that extend outward from the base in a vehicle longitudinal direction, a bumper cover positioned above the bumper energy absorber in a vehicle vertical direction, and a bumper cover reinforcement coupled to the bumper reinforcement beam, the bumper cover reinforcement including a bumper cover support portion including a base portion coupled to the bumper reinforcement beam, and an outward extending portion extending outward of the base portion in the vehicle longitudinal direction to an end, where the outward extending portion includes a horizontally extending portion and a vertically extending portion extending from the horizontally extending portion in the vehicle vertical direction, and where the bumper cover support portion resists a downward force applied to the bumper cover in the vehicle vertical direction.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Bumper assemblies according to the present specification bumper include a bumper reinforcement beam, a bumper cover positioned above the bumper reinforcement beam in a vehicle vertical direction, and a bumper cover reinforcement coupled to the bumper reinforcement beam, the bumper cover reinforcement including a bumper cover support portion including a base portion coupled to the bumper reinforcement beam, and an outward extending portion extending outward from the base portion in the vehicle longitudinal direction to an end. The outward extending portion includes a horizontally extending portion and a vertically extending portion, where at least one of the horizontally extending portion decreases in dimension along a length of the bumper cover support portion and the vertically extending portion decreases in dimension along the length of the bumper cover support portion. The bumper cover reinforcement limits movement of a bumper cover in response to a downward vertical force, which can improve static subjective rigidity of the bumper cover. The bumper cover reinforcement also selectively deforms and may disengage from the bumper reinforcement beam in response to a vehicle longitudinal force, which can maintain pedestrian performance of the bumper assembly. These and other embodiments will be described in more detail below in reference to the appended drawings.

As used herein, the term "vehicle longitudinal direction" refers to the forward-rearward direction of the vehicle (i.e., in the +/− vehicle X-direction as depicted). The term "vehicle lateral direction" refers to the cross-vehicle direction (i.e., in the +/− vehicle Y-direction as depicted), and is transverse to the vehicle longitudinal direction. The term "vehicle vertical direction" refers to the upward-downward direction of the vehicle (i.e., in the +/− vehicle Z-direction as depicted). Further, the terms "inboard" and "outboard" are used to describe the relative positioning of various components of the vehicle with respect to a centerline of the vehicle in the vehicle lateral direction.

Motor vehicles that incorporate elements according to the present disclosure may include a variety of construction methodologies that are conventionally known, including the unibody construction methodology as well as a body-on-frame construction methodology. While the embodiments of the present disclosure are described and depicted herein in reference to body-on-frame structures, it should be understood that vehicles that are constructed with unibody construction may incorporate the elements that are shown and described herein.

Figure 1:
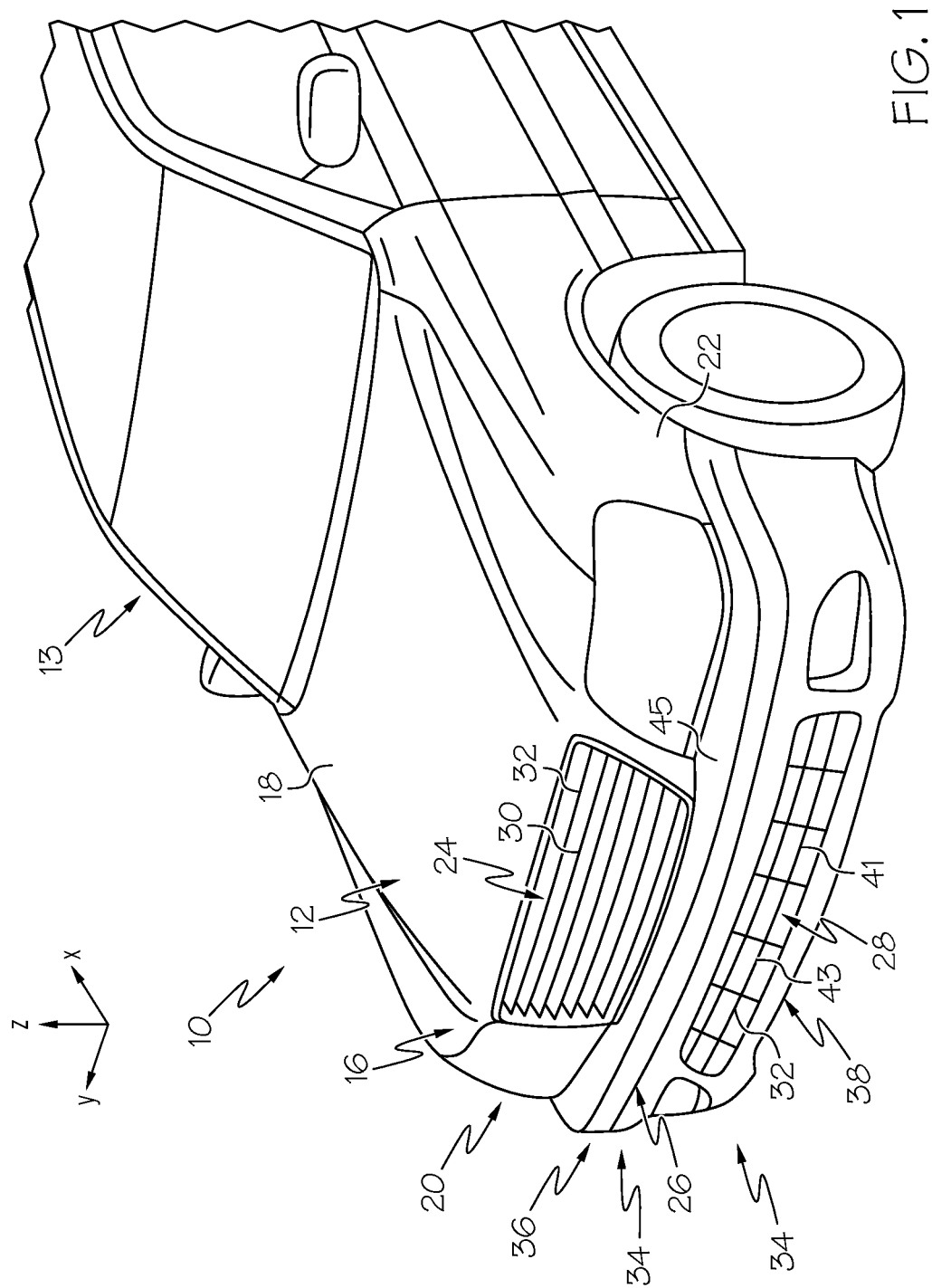
FIG. 1 schematically depicts a perspective view of a vehicle according to one or more embodiments shown or described herein.

Referring initially to FIG. 1, a vehicle 10 is depicted. The vehicle 10 includes a body 12 onto which a vehicle drivetrain is coupled. The vehicle 10 also includes a cabin 13 that is integral with the body 12. The cabin 13 generally defines a passenger cabin of the vehicle 10. A front portion 16 of the vehicle 10 includes a hood 18, front fenders 20 and 22, an upper grille assembly 24, a front bumper assembly 26 and a lower grille assembly 28 extending between the front fenders 20 and 22 in the vehicle lateral direction. Generally, the upper grille assembly 24 includes a covering portion 30 with a number of horizontally oriented grille deflectors 32, a mesh or other suitable covering that protects a radiator behind the covering portion 30, while allowing air to flow past the covering portion 30 and over the radiator. The front bumper assembly 26 of the vehicle 10 includes an outer covering or bumper fascia 34, an upper projecting bumper portion 36 and a lower projecting bumper portion 38 that under hangs the upper projecting bumper portion 36. In some embodiments, the bumper fascia 34 may provide a bumper cover 45. In other embodiments, the bumper cover 45 may be formed by a separate cover structure as part of the lower projecting bumper portion 38. The lower grille assembly 28 may include a covering portion 41 with a number of horizontally oriented grille deflectors 43 and be located between the upper projecting bumper portion 36 and the lower projecting bumper portion 38.

Figure 2:
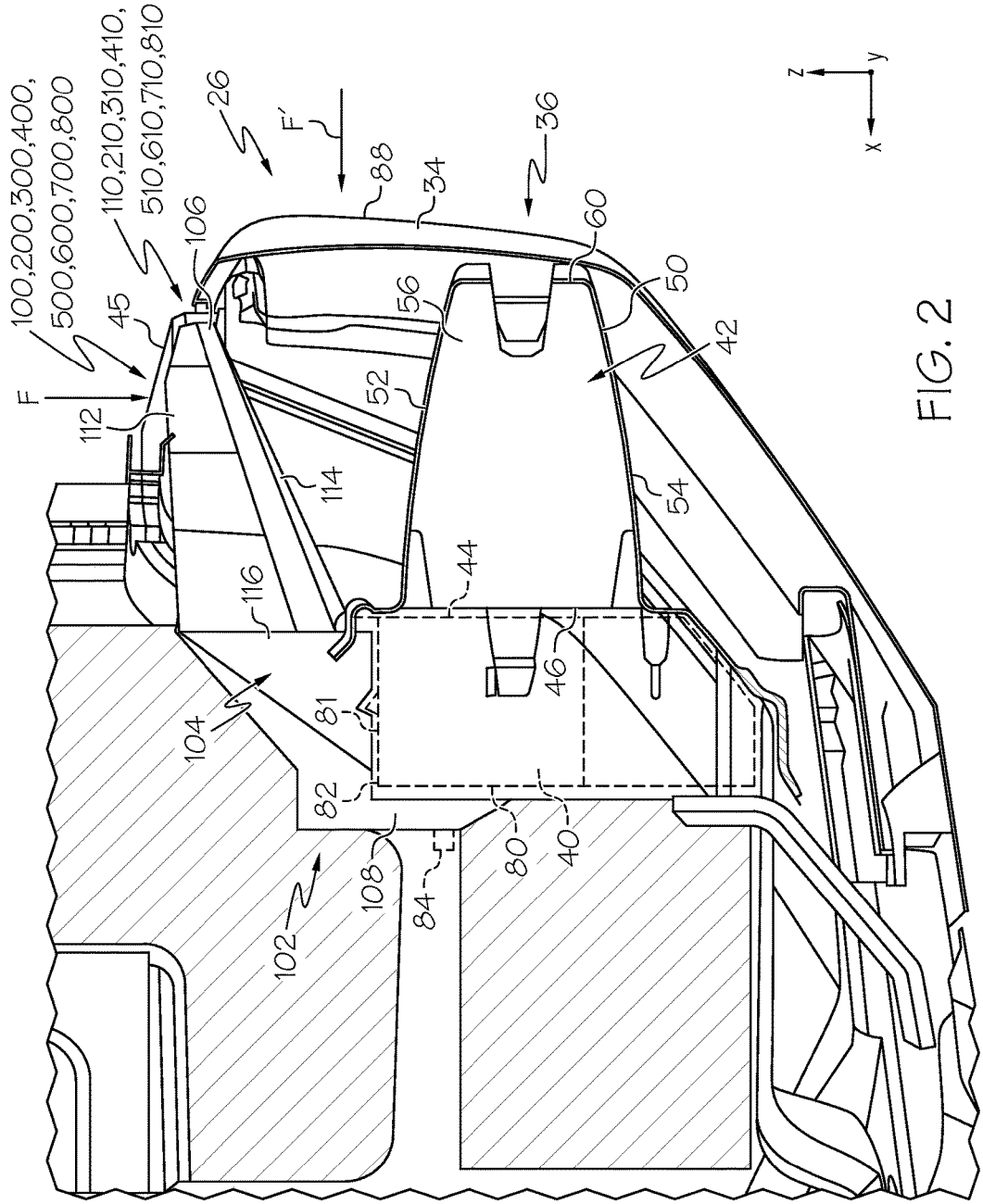
FIG. 2 schematically depicts a side, section view of a bumper assembly of the vehicle of FIG. 1 including a bumper cover reinforcement according to one or more embodiments shown or described herein.

Referring to FIG. 2, the bumper fascia 34 is an outer covering for covering a bumper reinforcement beam 40 and a bumper energy absorber member 42 that both extend in the vehicle lateral direction between the front fenders 20 and 22 (FIG. 1). The bumper reinforcement beam 40 may generally have a curved shape in the vehicle lateral direction and extend forward in the vehicle longitudinal direction to a front face 44. The bumper fascia 34 also extends forward at the upper projecting bumper portion 36 to cover the bumper reinforcement beam 40 and bumper energy absorber member 42. A space may be provided between the bumper fascia 34 and the bumper energy absorber member 42. The space can allow for some rearward deformation of the bumper fascia 34 at the upper projecting bumper portion 36 before contacting the bumper energy absorber member 42. In other embodiments, the space may not be provided between the bumper fascia 34 and the bumper energy absorber member 42. For example, the bumper fascia 34 may be coupled directly to the bumper energy absorber member 42.

The front bumper assembly 26 includes the bumper reinforcement beam 40 with the bumper energy absorber member 42 coupled thereto and extending forward in the vehicle longitudinal direction. The bumper energy absorber member 42 may be coupled to the bumper reinforcement beam 40 by any suitable method, including but not limited to, welded joints, brazed joints, mechanical fasteners, and structural adhesives. The bumper energy absorber member 42 may generally include a mounting structure or base 46 that extends laterally along a length of the bumper reinforcement beam 40. A set of energy absorbing lobes 50 project forward from the base 46 in the vehicle longitudinal direction.

Figure 3:
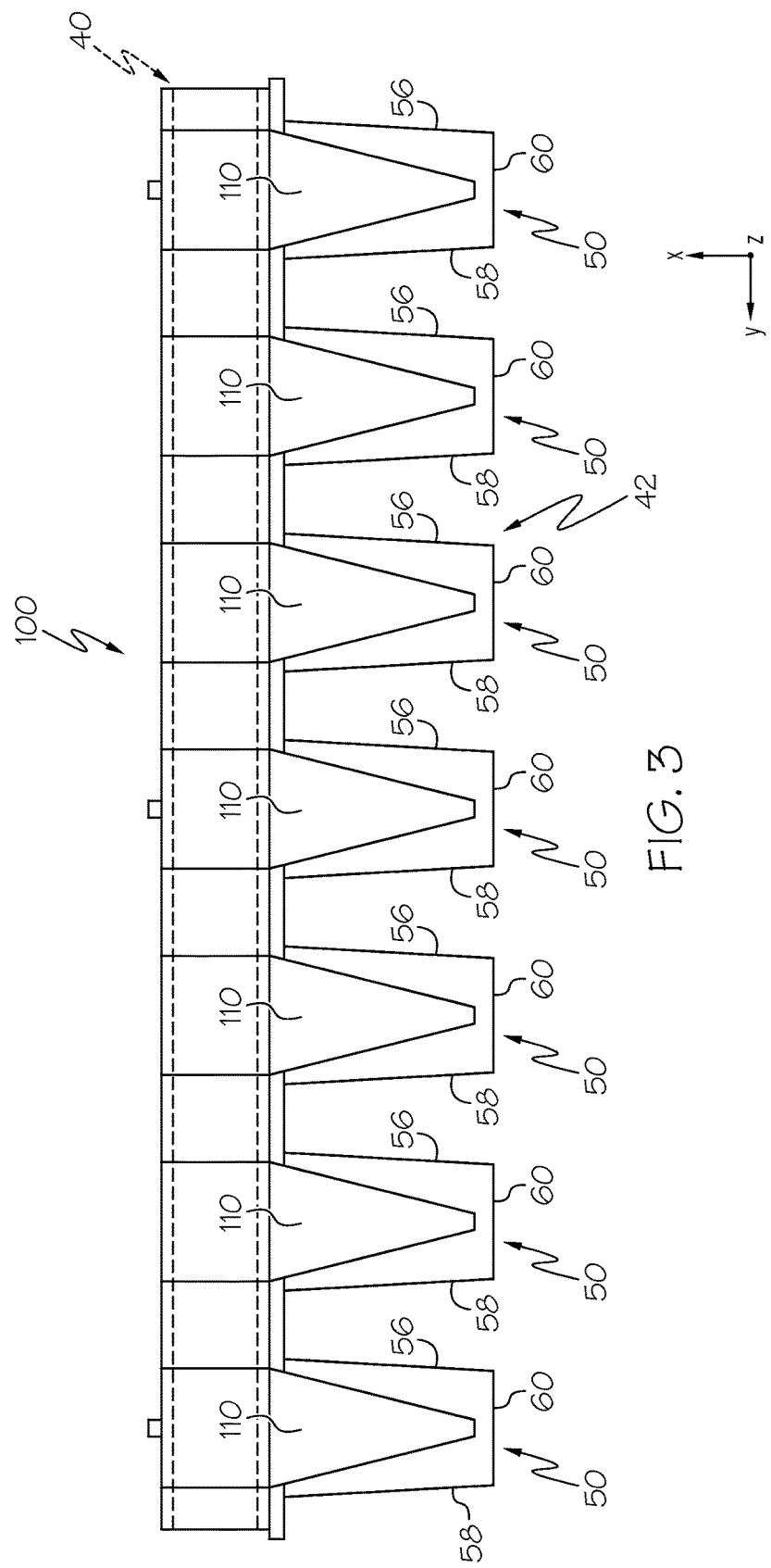
FIG. 3 schematically depicts a top view of the bumper assembly including the bumper cover reinforcement of FIG. 2 according to one or more embodiments shown or described herein.

Referring collectively to FIGS. 2 and 3, each of the energy absorbing lobes 50 includes a top 52, a bottom 54, sides 56 and 58 and an end 60 forming an at least partially closed, box-like structure. The energy absorbing lobes 50 may be each spaced-apart from each other in the vehicle lateral direction. The bumper energy absorber member 42 and the energy absorbing lobes 50 may be formed of any suitable material, such as plastic, and be formed by any suitable method, such as molding, machining, etc.

Referring again to FIG. 2, a bumper cover reinforcement 100 is used to reinforce the bumper cover 45 in the vehicle vertical direction. The bumper cover reinforcement 100 may include an anchor portion 102 that includes an upper beam engaging portion 104 that engages a top face 81 of the bumper reinforcement beam 40 and a rear beam engaging portion 108 that engages a rear face 80 of the bumper reinforcement beam 40. In the embodiment of FIG. 2, the upper beam engaging portion 104 of the anchor portion 102 extends rearward in the vehicle longitudinal direction over the top face 81 and a rear upper corner 82 of the bumper reinforcement beam 40. The rear beam engaging portion 108 extends downward in the vehicle vertical direction from the upper beam engaging portion 104 such that the anchor portion 102 extends over at least a portion of the rear face 80 of the bumper reinforcement beam 40. In some embodiments, a releasable connection 84, such as a releasable fastener, adhesive, etc., may be used to releasably secure the rear beam engaging portion 108 to the rear face 80 of the bumper reinforcement beam 40. In other embodiments, the anchor portion 102 may be rigidly coupled to the bumper reinforcement beam 40 by any suitable attachment, including but not limited to, welded joints, brazed joints, mechanical fasteners, and structural adhesives.

Referring to FIG. 3, a top view of the bumper cover reinforcement 100 and the bumper energy absorber member 42 is depicted. As shown, each of the energy absorbing lobes 50 and the bumper cover support portions 110 extend forward in the vehicle longitudinal direction from the bumper reinforcement beam 40. Ones of the bumper cover support portions 110 of the bumper cover reinforcement 100 are aligned with ones of the energy absorbing lobes 50 of the bumper energy absorber member 42 in the vehicle lateral direction and are positioned directly above ones the energy absorbing lobes 50 in the vehicle vertical direction. In embodiments, ones of the bumper cover support portions 110 of the bumper cover reinforcement 100 and ones of the energy absorbing lobes 50 of the bumper energy absorber member 42 may be offset from one another in the vehicle lateral direction, such that the bumper cover support portions 110 and the energy absorbing lobes 50 are staggered in the vehicle lateral direction.

Figure 4:
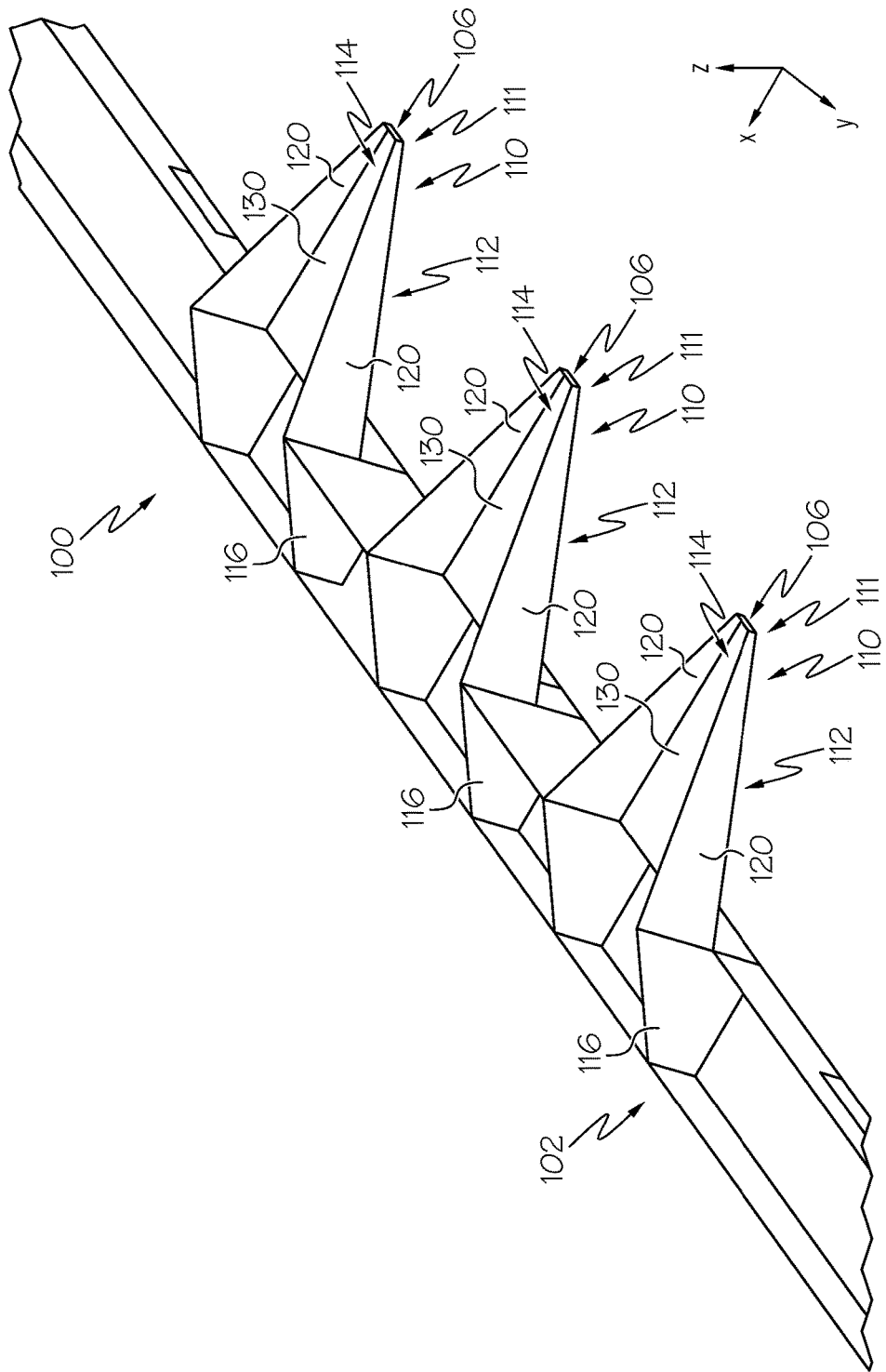
FIG. 4 schematically depicts a perspective view of the bumper cover reinforcement of FIG. 3 according to one or more embodiments shown or described herein.

Referring to FIG. 4, a perspective view of the bumper cover reinforcement 100 is depicted. Each of the bumper cover support portions 110 include a base portion 116 that is integral with the anchor portion 102 and an outward extending portion 111 that extends outward from the base portion 116 in the vehicle longitudinal direction. The outward extending portions 111 include a horizontally extending portion 114 that generally, although not necessarily exclusively, extends in a horizontal plane (i.e., in the X-Y plane as depicted), a vertically extending portion or vertically extending portions 112 that generally, although not necessarily exclusively, extend in a vertical plane (i.e., in the X-Z plane as depicted).

The horizontally extending portion 114 of each of the outward extending portions 111 includes a bottom floor 130 that extends between the base portion 116 and an end 106 of the bumper cover support portions 110 in the vehicle longitudinal direction. The vertically extending portions 112 of each of the outward extending portions 111 include a side wall or side walls 120 that extend upward from the bottom floor 130. In the embodiment shown in FIG. 4, each of the vertically extending portions 112 include the pair of side walls 120 that are spaced apart from one another in the vehicle lateral direction and that extend upward from the bottom floor 130, thereby giving each of the outward extending portions 111 a u-shaped cross-section or cup shape.

Figure 5A:
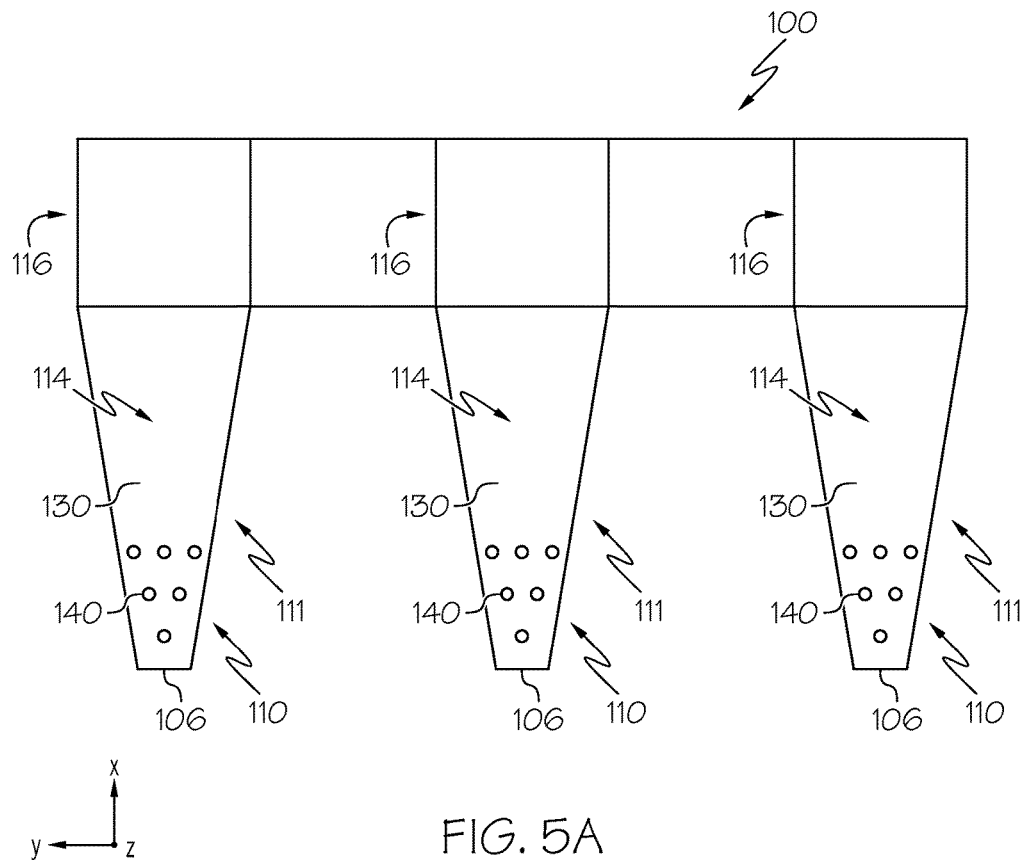
FIG. 5A schematically depicts a top view of the bumper cover reinforcement of FIG. 4 according to one or more embodiments shown or described herein.
Figure 5B:
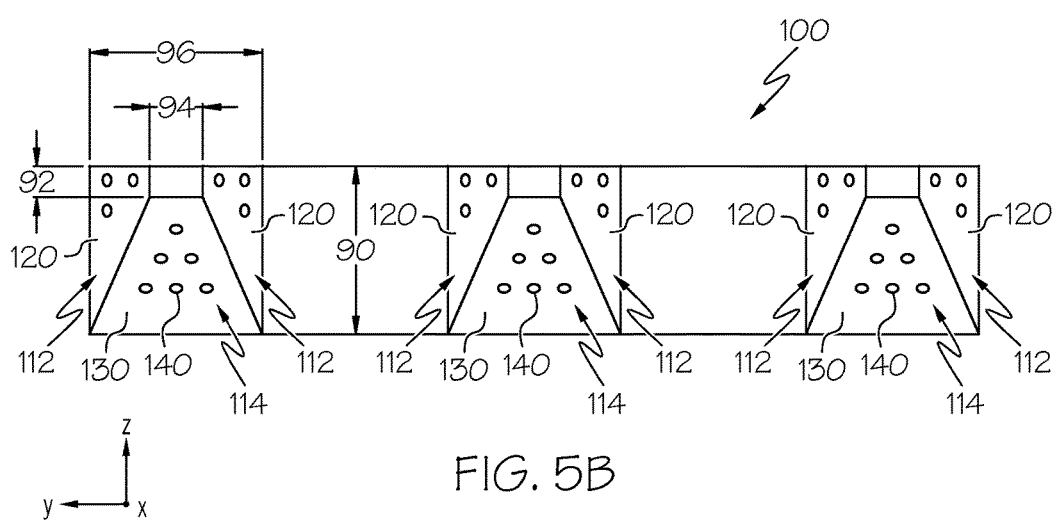
FIG. 5B schematically depicts a front view of the bumper cover reinforcement of FIG. 5A according to one or more embodiments shown or described herein.

Referring to FIGS. 5A and 5B, a top view and a front view, respectively, of the bumper cover reinforcement 100 is depicted. The bottom floor 130 of the outward extending portions 111 extends upward in the vehicle vertical direction along a length of outward extending portions 111 extending forward in the vehicle longitudinal direction. In particular, the bottom floor 130 is positioned lower in the vehicle vertical direction where the bottom floor 130 meets the base portion 116 than at the position where the bottom floor 130 meets the end 106. The pair of side walls 120 have a base height 90 evaluated in the vehicle vertical direction at the position where the pair of side walls 120 meet the base portion 116, and the pair of side walls 120 have a end height 92 evaluated in the vehicle vertical direction at the end 106, where the base height 90 is greater than the end height 92. The pair of side walls 120 are spaced apart from one another by a base width 96 evaluated in the vehicle lateral direction where the pair of side walls 120 meet the base portion 116, and the pair of side walls 120 are spaced apart from one another by a end width 94 evaluated in the vehicle lateral direction at the end 106, where the base width 96 is greater than the end width 94.

Accordingly, each of the bumper cover support portions 110 are tapered extending forward in the vehicle longitudinal direction from the base portion 116, thereby decreasing in dimension in both the vehicle vertical direction and the vehicle lateral direction along a length of the bumper cover support portions 110 from the base portion 116 to the end 106. As a result of the tapered shape of the bumper cover support portions 110, the bumper cover support portions 110 may have a higher strength and/or stiffness evaluated in the vehicle vertical direction as compared to the strength and/or stiffness of the bumper cover support portions 110 evaluated in the vehicle longitudinal direction.

In the embodiment depicted in FIGS. 5A and 5B, the bumper cover support portions 110 include one or more reduced thickness regions 140 positioned on the bottom floor 130 and/or the side walls 120 of the outward extending portions 111. In embodiments, the reduced thickness regions 140 may include through holes and/or slots through the bottom floor 130 and/or the side walls 120. The reduced thickness regions 140 may alternatively or additionally include regions of locally reduced material thickness in which the material thickness within the reduced thickness regions 140 is less than a material thickness of the bumper cover support portions 110 at positions outside the reduced thickness regions 140. In either instance, the reduced thickness regions 140 may reduce the strength and/or stiffness of the bumper cover support portions 110 evaluated in the vehicle longitudinal direction as compared to bumper cover support portions 110 that do not include reduced thickness regions 140, such that the bumper cover support portions 110 preferentially deform in the vehicle longitudinal direction, as will be described in greater detail herein.

Referring back to FIG. 2, in operation, the bumper cover reinforcement 100 provides additional resistance to a downward force F applied to the bumper cover 45 in the vehicle vertical direction. Such a force F tends to cause downward deflection of the bumper cover 45, movement of which is resisted by the bumper cover reinforcement 100, and in particular the bumper cover support portions 110 of the bumper cover reinforcement 100 positioned adjacent to the bumper cover 45. As the bumper cover support portions 110 are coupled to the bumper reinforcement beam 40, downward movement of the bumper cover support portions 110 may be resisted by the bumper reinforcement beam 40.

However, during an impact or impact test, such as a legform impact test or upper legform impact test, a force F' may be applied to the bumper fascia 34 in the vehicle longitudinal direction. While the force F' is depicted as being primarily directed rearward in the vehicle longitudinal direction, it should be understood that the force F' may additionally be applied at least partially upward or downward in the vehicle vertical direction, such as during an upper legform impact test. Such a force tends to cause rearward deflection of the bumper fascia 34 in the vehicle longitudinal direction, movement of which is resisted by the bumper energy absorber member 42 and the bumper cover reinforcement 100. The bumper energy absorber member 42, and in particular the energy absorbing lobes 50 of the bumper energy absorber member 42 may selectively deform in the vehicle longitudinal direction, absorbing energy associated with the impact in accordance with pedestrian impact standards.

The bumper cover support portions 110 of the bumper cover support may similarly selectively deform in the vehicle longitudinal direction, absorbing energy associated with the impact. As described above, the outward extending portions 111 of the bumper cover support portions 110 are tapered extending forward in the vehicle longitudinal direction such that the strength and/or stiffness of the bumper cover support portions 110 evaluated in the vehicle longitudinal direction that is less than the strength and/or stiffness of the bumper cover support portions 110 evaluated in the vehicle vertical direction. Additionally, in some embodiments, the bumper cover support portions 110 include the reduced thickness regions 140 that reduce the strength and/or the stiffness of the bumper cover support portions 110 evaluated in the vehicle longitudinal direction. Accordingly, when the force F' is applied to the bumper cover support portions 110 through the bumper fascia 34, the bumper cover support portions 110 may selectively deform in the vehicle longitudinal direction in a manner that is similar to the bumper energy absorber member 42.

Further, when the force F' is applied to the bumper fascia 34, the bumper cover reinforcement 100 may selectively detach from the bumper reinforcement beam 40, such as when the bumper cover reinforcement 100 is coupled to the bumper reinforcement beam 40 with the releasable connection 84. By selectively detaching from the bumper reinforcement beam 40, the bumper cover reinforcement 100 may provide little or no resistance to the application of the force F' in the vehicle longitudinal direction to the bumper fascia 34. Accordingly, by selectively deforming in the vehicle longitudinal direction and/or detaching from the bumper reinforcement beam 40, the bumper cover reinforcement 100 may provide minimal resistance to the rearward movement of the bumper fascia 34 in addition to the resistance provided by the energy absorbing lobes 50 of the bumper energy absorber member 42. In this way, the bumper cover reinforcement 100 may not significantly affect the selective deformation of the bumper energy absorber member 42 upon the application of the force F' to the bumper fascia 34 in the vehicle longitudinal direction, such that front portion 16 of the vehicle 10 absorbs energy associated with the impact in accordance with pedestrian impact standards.

Figure 6A:
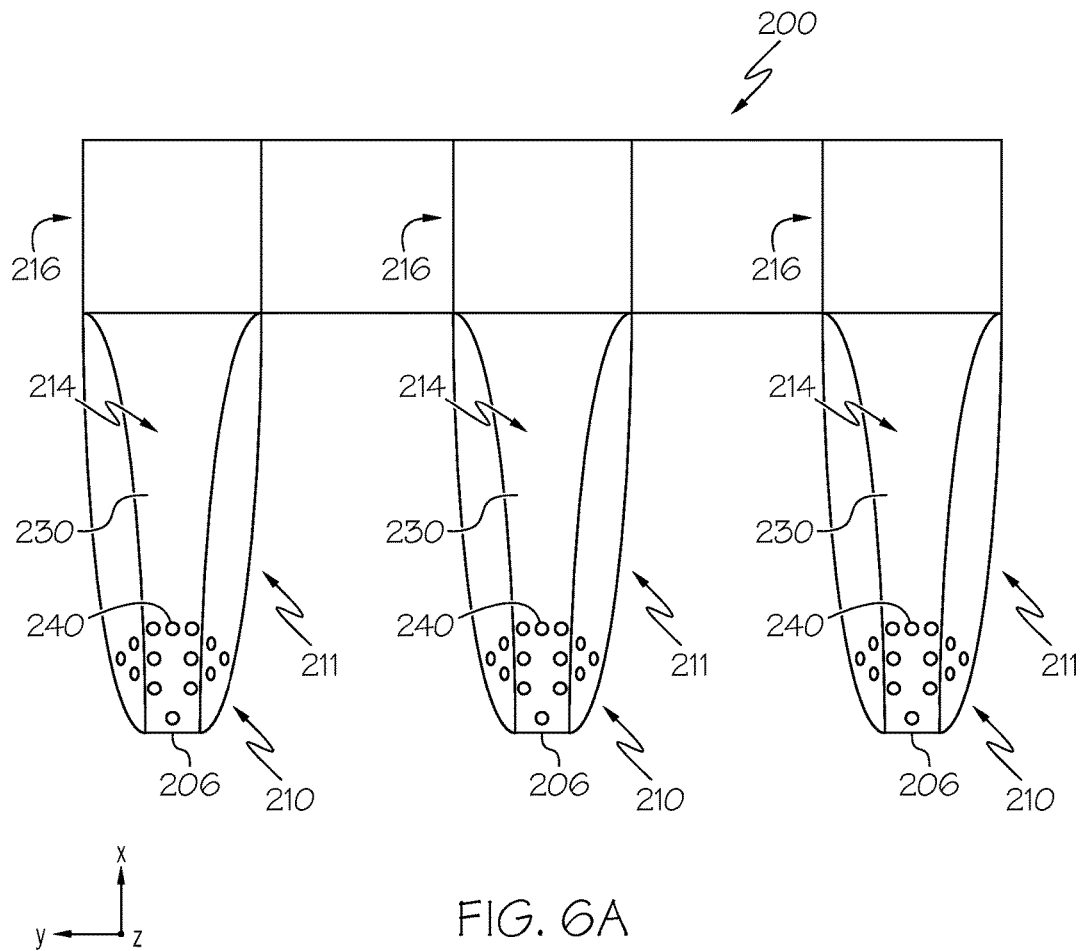
FIG. 6A schematically depicts a top view of another bumper cover reinforcement according to one or more embodiments shown or described herein.
Figure 6B:
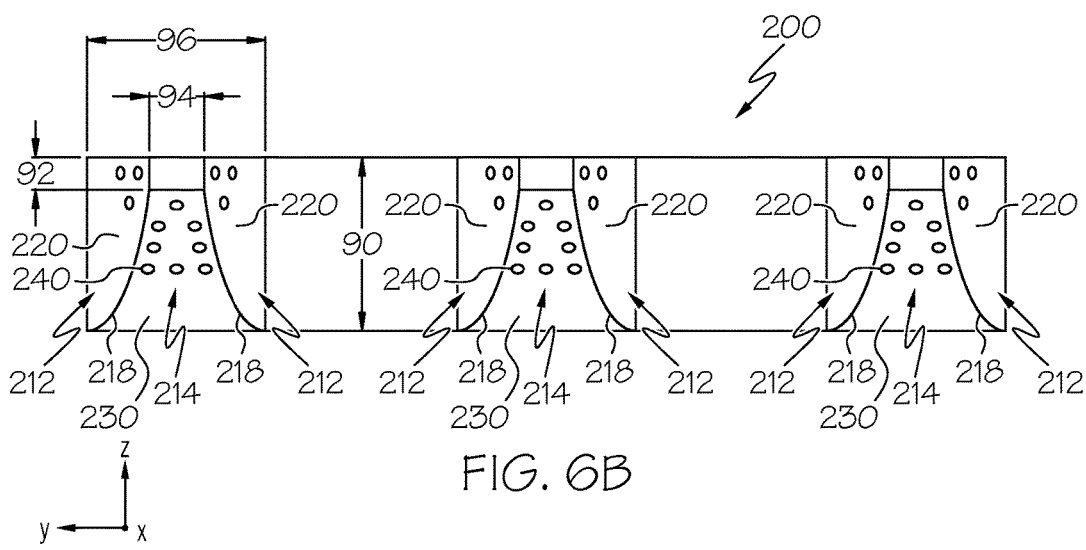
FIG. 6B schematically depicts a front view of the bumper cover reinforcement of FIG. 6A according to one or more embodiments shown or described herein.

Referring to FIGS. 6A and 6B, a top view and a front view of another embodiment of a bumper cover reinforcement 200 is depicted. Similar to the embodiment depicted in FIGS. 2-5B, the bumper cover reinforcement 200 includes a bumper cover support portion or bumper cover support portions 210 that include an outward extending portion 211 that extends from the base portion 216 to an end 206 in the vehicle longitudinal direction. The outward extending portions 211 include a horizontally extending portion 214 that generally, although not necessarily exclusively, extends in a horizontal plane (i.e., in the X-Y plane as depicted), a vertically extending portion or vertically extending portions 212 that generally, although not necessarily exclusively, extend in a vertical plane (i.e., in the X-Z plane as depicted), and a base portion 216. In the embodiment depicted in FIGS. 6A and 6B, the horizontally extending portion 214 extends upward in the vehicle vertical direction in an arc 218 along a length of the bumper cover support portions 210 in the vehicle longitudinal direction.

The horizontally extending portion 214 of the outward extending portions 211 includes a bottom floor 230 that extends between a base portion 216 and an end 206 of the outward extending portions 211 in the vehicle longitudinal direction. The vertically extending portions 212 of each of the outward extending portions 211 include a side wall or side walls 220 that extend upward from the bottom floor 230 in the vehicle vertical direction. In the embodiment shown in FIGS. 6A and 6B, each of the outward extending portions 211 include the pair of side walls 220 that are spaced apart from one another in the vehicle lateral direction and extend upward from the bottom floor 230, thereby giving each of the outward extending portions 211 a u-shaped cross-section or cup shape.

The bottom floor 230 extends upward in the vehicle vertical direction in the arc 218 along a length of the bumper cover support portions 210 in the vehicle longitudinal direction from the base portion 216 to the end 206. In particular, the bottom floor 230 is positioned lower in the vehicle vertical direction where the bottom floor 230 meets the base portion 216 than at the position where the bottom floor 230 meets the end 206. The pair of side walls 220 have a base height 90 evaluated in the vehicle vertical direction at the position where the pair of side walls 220 meet the base portion 216, and the pair of side walls 220 have a end height 92 evaluated in the vehicle vertical direction at the end 206, where the base height 90 is greater than the end height 92. The pair of side walls 220 are spaced apart from one another by a base width 96 in the vehicle lateral direction where the pair of side walls 220 meet the base portion 216, and the pair of side walls 220 are spaced apart from one another by a end width 94 evaluated in the vehicle lateral direction at the end 206, where the base width 96 is greater than the end width 94.

Accordingly, each outward extending portion 211 of the bumper cover support portions 210 are tapered extending forward in the vehicle longitudinal direction from the base portion 216, thereby decreasing in dimension in both the vehicle vertical direction and the vehicle lateral direction along a length of the bumper cover support portions 210 from the base portion 216 to the end 206. In the embodiment shown in FIGS. 6A and 6B, the height of the side walls 220 decrease in dimension in the vehicle vertical direction along the arc 218 extending forward in the vehicle longitudinal direction. As a result of the tapered shape of the bumper cover support portions 210, the bumper cover support portions 210 may have a higher strength and/or stiffness evaluated in the vehicle vertical direction as compared to the strength and/or stiffness evaluated in the vehicle longitudinal direction.

In the embodiment depicted in FIGS. 6A and 6B, the bumper cover support portions 210 include one or more reduced thickness regions 240 positioned on the bottom floor 230 and/or the side walls 220 of the outward extending portions 211. In embodiments, the reduced thickness regions 240 may include through holes and/or slots through the bottom floor 230 and/or the side walls 220. The reduced thickness regions 240 may alternatively or additionally include regions of locally reduced material thickness in which the material thickness within the reduced thickness regions 240 is less than a material thickness of the bumper cover support portions 210 positioned outside the reduced thickness regions 240. In either instance, the reduced thickness regions 240 may reduce the strength and/or stiffness of the bumper cover support portions 210 evaluated in the vehicle longitudinal direction as compared to bumper cover support portions 210 that do not include reduced thickness regions 240, such that the bumper cover support portions 210 preferentially deform in the vehicle longitudinal direction, as will be described in greater detail herein.

Referring back to FIG. 2, in operation, the bumper cover reinforcement 200 provides additional resistance to a downward force F applied to the bumper cover 45 in the vehicle vertical direction. Such a force F tends to cause downward deflection of the bumper cover 45, movement of which is resisted by the bumper cover reinforcement 200, and in particular the bumper cover support portions 210 of the bumper cover reinforcement 200 positioned adjacent to the bumper cover 45. As the bumper cover support portions 210 are coupled to the bumper reinforcement beam 40, downward movement of the bumper cover support portions 210 may be resisted by the bumper reinforcement beam 40.

When the force F' is applied to the bumper fascia 34 in the vehicle longitudinal direction, the bumper energy absorber member 42, and in particular the energy absorbing lobes 50 of the bumper energy absorber member 42 may selectively deform in the vehicle longitudinal direction. The bumper cover support portions 210 of the bumper cover support may similarly selectively deform in the vehicle longitudinal direction, absorbing energy associated with the impact. As described above, the outward extending portions 211 of the bumper cover support portions 210 are tapered extending forward in the vehicle longitudinal direction such that the strength and/or stiffness of the bumper cover support portions 210 evaluated in the vehicle longitudinal direction that is less than the strength and/or stiffness of the bumper cover support portions 210 evaluated in the vehicle vertical direction.

Further, the horizontally extending portion 214 of the bumper cover support portions 210 extend upward in the vehicle vertical direction along the arc 218, which may encourage the bumper cover support portions 210 to selectively deform in the vehicle longitudinal direction. In particular, upon application of the force F' to the bumper cover support portions 210 in the vehicle longitudinal direction through the bumper fascia 34, the arc 218 may encourage the bumper cover support portions 210 to bend or fold upward in the vehicle vertical direction about the vehicle lateral direction. By bending or folding upward, the bumper cover support portions may selectively deform, allowing the bumper fascia 34 to translate rearward in the vehicle longitudinal direction.

Additionally, in some embodiments, the bumper cover support portions 210 include the reduced thickness regions 240 that reduce the strength and/or the stiffness of the bumper cover support portions 210 evaluated in the vehicle longitudinal direction. Accordingly, when the force F' is applied to the bumper cover support portions 210 through the bumper fascia 34, the bumper cover support portions 210 may selectively deform in the vehicle longitudinal direction in a manner that is similar to the bumper energy absorber member 42.

Further, when the force F' is applied to the bumper fascia 34, the bumper cover reinforcement 200 may selectively detach from the bumper reinforcement beam 40, such as when the bumper cover reinforcement 200 is coupled to the bumper reinforcement beam 40 with the releasable connection 84. By selectively detaching from the bumper reinforcement beam 40, the bumper cover reinforcement 200 may provide little or no resistance to the application of the force F' in the vehicle longitudinal direction to the bumper fascia 34. Accordingly, by selectively deforming in the vehicle longitudinal direction and/or detaching from the bumper reinforcement beam 40, the bumper cover reinforcement 200 may provide minimal resistance to the rearward movement of the bumper fascia 34 in addition to the resistance provided by the energy absorbing lobes 50 of the bumper energy absorber member 42. In this way, the bumper cover reinforcement 200 may not significantly affect the selective deformation of the bumper energy absorber member 42 upon the application of the force F' to the bumper fascia 34 in the vehicle longitudinal direction, such that front portion 16 of the vehicle 10 absorbs energy associated with the impact in accordance with pedestrian impact standards.

Figure 7A:
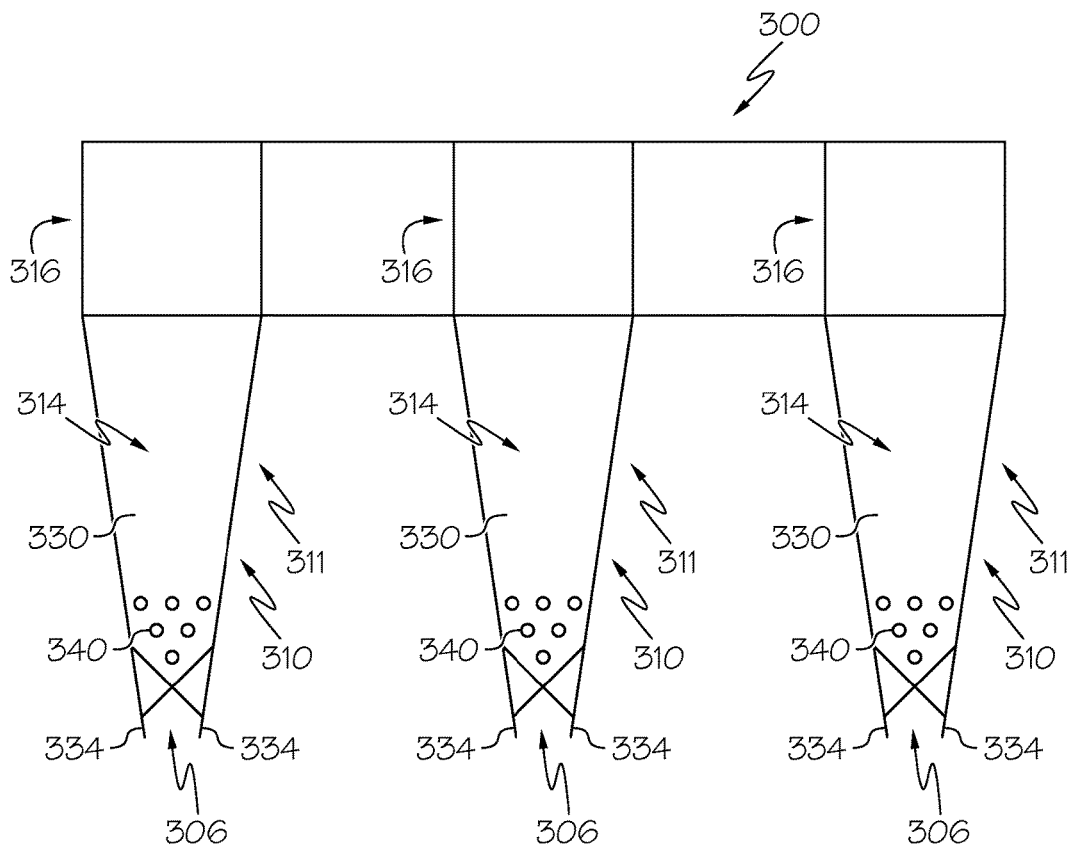
FIG. 7A schematically depicts a top view of another bumper cover reinforcement according to one or more embodiments shown or described herein.
Figure 7B:
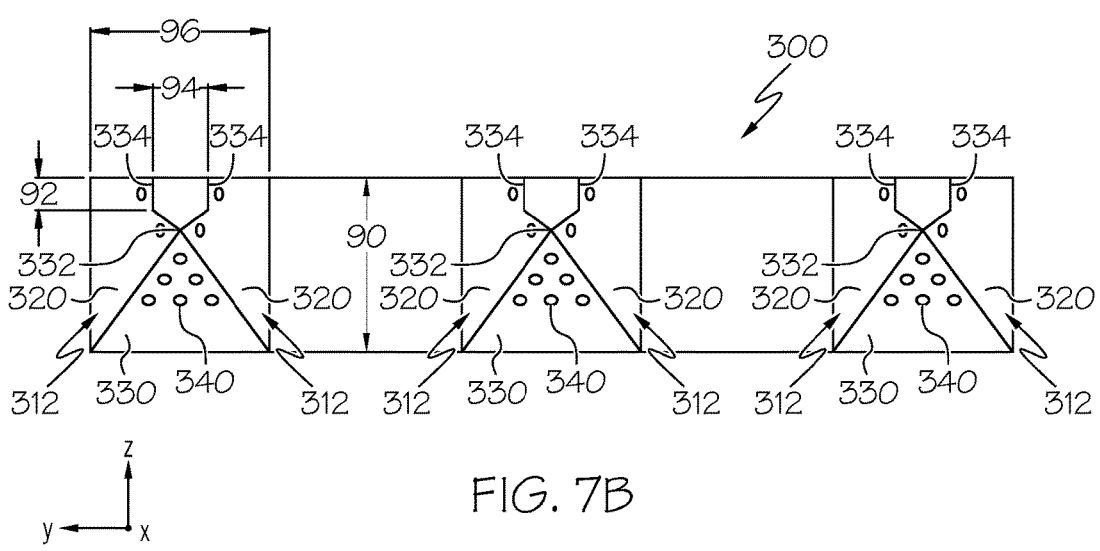
FIG. 7B schematically depicts a front view of the bumper cover reinforcement of FIG. 7A according to one or more embodiments shown or described herein.

Referring to FIGS. 7A and 7B, a top view and a front view of another embodiment of a bumper cover reinforcement 300 is depicted. Similar to the embodiment depicted in FIGS. 2-6B, the bumper cover reinforcement 300 include a bumper cover support portion or bumper cover support portions 310 that include an outward extending portion 311 that extends forward from the base portion 316 to an end 306 in the vehicle longitudinal direction. The outward extending portions 311 include a horizontally extending portion 314 that generally, although not necessarily exclusively, extends in a horizontal plane (i.e., in the X-Y plane as depicted), a vertically extending portion or vertically extending portions 312 that generally, although not necessarily exclusively, extend in a vertical plane (i.e., in the X-Z plane as depicted), and a base portion 316. In the embodiment depicted in FIGS. 7A and 7B, the horizontally extending portion 314 extends forward from the base portion 316 to a point 332 in the vehicle longitudinal direction, and the vertically extending portions 312 extend forward and upward from the point 332 of the horizontally extending portion 314.

The horizontally extending portion 314 of the outward extending portions 311 includes a bottom floor 330 that extends between a base portion 316 of the bumper cover support portions 310 and the point 223 of the horizontally extending portion 314. The vertically extending portions 312 of each of the outward extending portions 311 include a side wall or side walls 320 that extend upward from the bottom floor 330 in the vehicle vertical direction. In the embodiment shown in FIGS. 7A and 7B, each of the outward extending portions 311 include the pair of side walls 320 that are spaced apart from one another in the vehicle lateral direction and extend upward from the bottom floor 330, thereby giving each of the outward extending portions 311 a u-shaped cross-section or cup shape.

The bottom floor 330 extends upward in the vehicle vertical direction along a length of the bumper cover support portions 310 in the vehicle longitudinal direction from the base portion 316 to the point 332. In particular, the bottom floor 330 is positioned lower in the vehicle vertical direction where the bottom floor 330 meets the base portion 316 than at the position where the bottom floor 330 meets the point 332. The pair of side walls 320 have a base height 90 evaluated in the vehicle vertical direction at the position where the pair of side walls 320 meet the base portion 316, and the pair of side walls 320 have a end height 92 evaluated in the vehicle vertical direction at the end 306, where the base height 90 is greater than the end height 92. The pair of side walls 320 are spaced apart from one another by a base width 96 in the vehicle lateral direction where the pair of side walls 320 meet the base portion 316, and the pair of side walls 320 are spaced apart from one another by a end width 94 evaluated in the vehicle lateral direction at the end 306, where the base width 96 is greater than the end width 94.

Accordingly, each of the outward extending portions 311 are tapered extending forward in the vehicle longitudinal direction from the base portion 316, thereby decreasing in dimension in both the vehicle vertical direction and the vehicle lateral direction along a length of the bumper cover support portions 310 from the base portion 316 to the end 306. As a result of the tapered shape of the bumper cover support portions 310, the bumper cover support portions 310 may have a higher strength and/or stiffness evaluated in the vehicle vertical direction as compared to the strength and/or stiffness evaluated in the vehicle longitudinal direction.

In the embodiment depicted in FIGS. 7A and 7B, the bumper cover support portions 310 include one or more reduced thickness regions 340 positioned on the bottom floor 330 and/or the side walls 320 of the outward extending portions 311. In embodiments, the reduced thickness regions 340 may include through holes and/or slots through the bottom floor 330 and/or the side walls 320. The reduced thickness regions 340 may alternatively or additionally include regions of locally reduced material thickness in which the material thickness within the reduced thickness regions 340 is less than a material thickness of the bumper cover support portions 310 positioned outside the reduced thickness regions 340. In either instance, the reduced thickness regions 340 may reduce the strength and/or stiffness of the bumper cover support portions 310 evaluated in the vehicle longitudinal direction as compared to bumper cover support portions 310 that do not include reduced thickness regions 340, such that the bumper cover support portions 310 preferentially deform in the vehicle longitudinal direction, as will be described in greater detail herein.

Referring back to FIG. 2, in operation, the bumper cover reinforcement 300 provides additional resistance to a downward force F applied to the bumper cover 45 in the vehicle vertical direction. Such a force F tends to cause downward deflection of the bumper cover 45, movement of which is resisted by the bumper cover reinforcement 300, and in particular the bumper cover support portions 310 of the bumper cover reinforcement 300 positioned adjacent to the bumper cover 45. As the bumper cover support portions 310 are coupled to the bumper reinforcement beam 40, downward movement of the bumper cover support portions 310 may be resisted by the bumper reinforcement beam 40.

When the force F' is applied to the bumper fascia 34 in the vehicle longitudinal direction, the bumper energy absorber member 42, and in particular the energy absorbing lobes 50 of the bumper energy absorber member 42 may selectively deform in the vehicle longitudinal direction. The bumper cover support portions 310 of the bumper cover support may similarly selectively deform in the vehicle longitudinal direction, absorbing energy associated with the impact. As described above, the outward extending portions 311 are tapered extending forward in the vehicle longitudinal direction such that the strength and/or stiffness of the bumper cover support portions 310 evaluated in the vehicle longitudinal direction that is less than the strength and/or stiffness of the bumper cover support portions 310 evaluated in the vehicle vertical direction. Further, the vertically extending portions 312 of the bumper cover support portions 310 extend forward of the point 332 of the horizontally extending portion 314 of the bumper cover support portions 310. As the vertically extending portions 312 extend forward of the horizontally extending portion 314 of the bumper cover support portions 310, the bumper cover support portions 310 may have a reduced cross-section at the end 306 as compared the bumper cover support portion 310 at the base portion 316. By including a reduced cross-section the end 306 of the bumper cover support portions 310 may selectively deform in the vehicle longitudinal direction at the end 306, allowing the bumper fascia 34 to translate rearward in the vehicle longitudinal direction.

Additionally, in some embodiments, the bumper cover support portions 310 include the reduced thickness regions 340 that reduce the strength and/or the stiffness of the bumper cover support portions 310 evaluated in the vehicle longitudinal direction. Accordingly, when the force F' is applied to the bumper cover support portions 310 through the bumper fascia 34, the bumper cover support portions 310 may selectively deform in the vehicle longitudinal direction in a manner that is similar to the bumper energy absorber member 42.

Further, when the force F' is applied to the bumper fascia 34, the bumper cover reinforcement 300 may selectively detach from the bumper reinforcement beam 40, such as when the bumper cover reinforcement 300 is coupled to the bumper reinforcement beam 40 with the releasable connection 84. By selectively detaching from the bumper reinforcement beam 40, the bumper cover reinforcement 300 may provide little or no resistance to the application of the force F' in the vehicle longitudinal direction to the bumper fascia 34. Accordingly, by selectively deforming in the vehicle longitudinal direction and/or detaching from the bumper reinforcement beam 40, the bumper cover reinforcement 300 may provide minimal resistance to the rearward movement of the bumper fascia 34 in addition to the resistance provided by the energy absorbing lobes 50 of the bumper energy absorber member 42. In this way, the bumper cover reinforcement 300 may not significantly affect the selective deformation of the bumper energy absorber member 42 upon the application of the force F' to the bumper fascia 34 in the vehicle longitudinal direction, such that front portion 16 of the vehicle 10 absorbs energy associated with the impact in accordance with pedestrian impact standards.

Figure 8A:
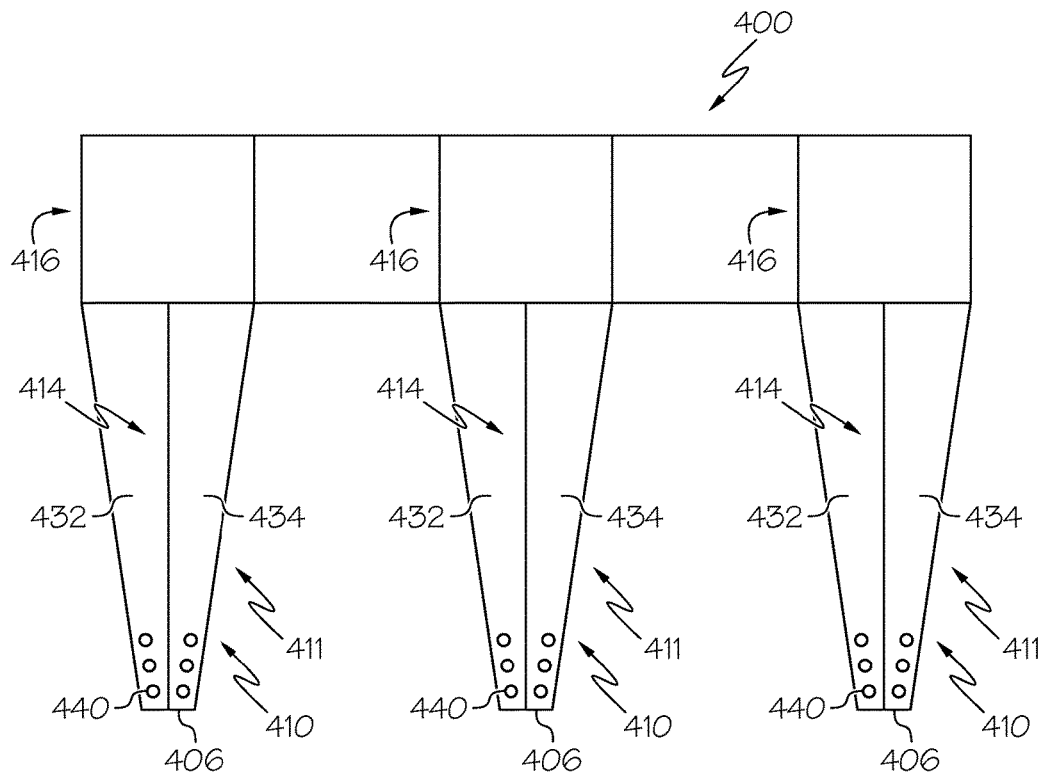
FIG. 8A schematically depicts a top view of another bumper cover reinforcement according to one or more embodiments shown or described herein.
Figure 8B:
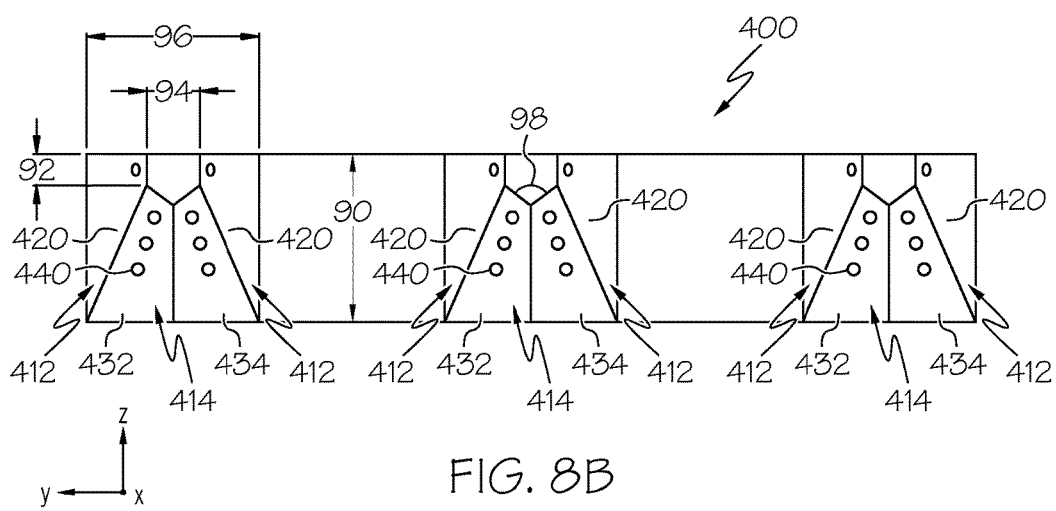
FIG. 8B schematically depicts a front view of the bumper cover reinforcement of FIG. 8A according to one or more embodiments shown or described herein.

Referring to FIGS. 8A and 8B, a top view and a front view of another embodiment of a bumper cover reinforcement 400 is depicted. Similar to the embodiment depicted in FIGS. 2-7B, the bumper cover reinforcement 400 includes a bumper cover support portion or bumper cover support portions 410 that include an outward extending portion 411 that extends forward from the base portion 416 to an end 406 in the vehicle longitudinal direction. The outward extending portions 411 include a horizontally extending portion 414 that generally, although not necessarily exclusively, extends in a horizontal plane (i.e., in the X-Y plane as depicted), a vertically extending portion or vertically extending portions 412 that generally, although not necessarily exclusively, extend in a vertical plane (i.e., in the X-Z plane as depicted), and a base portion 416. In the embodiment shown in FIGS. 8A and 8B, the horizontally extending portion 414 of the bumper cover support portions 410 include a first bottom floor 432 and a second bottom floor 434 that is positioned at an angle 98 with respect to the first bottom floor 432.

The first bottom floor 432 and the second bottom floor 434 extend in the vehicle longitudinal direction between the base portion 416 and the end 406 and are positioned at an angle 98 with respect to one another. In embodiments, the angle 98 is less than 180°. In some embodiments, the angle 98 is less than 180° and is greater than 45°. By positioning the first bottom floor 432 an the angle 98 with respect to the second bottom floor 434, the bumper cover support portions 410 may selectively deform in the vehicle longitudinal direction, as will be described in greater detail herein.

The vertically extending portions 412 of each of the outward extending portions 411 include a side wall or side walls 420 that extend upward from the first bottom floor 432 and the second bottom floor 434 in the vehicle vertical direction. In the embodiment shown in FIGS. 8A and 8B, each of the outward extending portions 411 include the pair of side walls 420 that are spaced apart from one another in the vehicle lateral direction and extend upward from the first bottom floor 432 and the second bottom floor 434, thereby giving each of the outward extending portions 411 a u-shaped cross-section or cup shape.

The first bottom floor 432 and the second bottom floor 434 extend upward in the vehicle vertical direction along a length of the bumper cover support portions 410 in the vehicle longitudinal direction from the base portion 416 to the end 406. In particular, the first bottom floor 432 and the second bottom floor 434 are positioned lower in the vehicle vertical direction where the first bottom floor 432 and the second bottom floor 434 meet the base portion 416 than at the position where the first bottom floor 432 and the second bottom floor 434 meet the end 406 of the bumper cover support portion 410. The pair of side walls 420 have a base height 90 evaluated in the vehicle vertical direction at the position where the pair of side walls 420 meet the base portion 416, and the pair of side walls 420 have a end height 92 evaluated in the vehicle vertical direction at the end 406, where the base height 90 is greater than the end height 92. The pair of side walls 420 are spaced apart from one another by a base width 96 in the vehicle lateral direction where the pair of side walls 420 meet the base portion 416, and the pair of side walls 420 are spaced apart from one another by a end width 94 evaluated in the vehicle lateral direction at the end 406, where the base width 96 is greater than the end width 94.

Accordingly, each of the bumper cover support portions 410 are tapered extending forward in the vehicle longitudinal direction from the base portion 416, thereby decreasing in dimension in both the vehicle vertical direction and the vehicle lateral direction along a length of the bumper cover support portions 410 from the base portion 416 to the end 406. As a result of the tapered shape of the bumper cover support portions 410, the bumper cover support portions 410 may have a higher strength and/or stiffness evaluated in the vehicle vertical direction as compared to the strength and/or stiffness evaluated in the vehicle longitudinal direction.

In the embodiment depicted in FIGS. 8A and 8B, the bumper cover support portions 410 include one or more reduced thickness regions 440 positioned on the first bottom floor 432, the second bottom floor 434 and/or the side walls 420 of the outward extending portions 411. In embodiments, the reduced thickness regions 440 may include through holes and/or slots through the bottom floor 430 and/or the side walls 420. The reduced thickness regions 440 may alternatively or additionally include regions of locally reduced material thickness in which the material thickness within the reduced thickness regions 440 is less than a material thickness of the bumper cover support portions 410 positioned outside the reduced thickness regions 440. In either instance, the reduced thickness regions 440 may reduce the strength and/or stiffness of the bumper cover support portions 410 evaluated in the vehicle longitudinal direction, such that the bumper cover support portions 410 preferentially deform in the vehicle longitudinal direction, as will be described in greater detail herein.

Referring back to FIG. 2, in operation, the bumper cover reinforcement 400 provides additional resistance to a downward force F applied to the bumper cover 45 in the vehicle vertical direction. Such a force F tends to cause downward deflection of the bumper cover 45, movement of which is resisted by the bumper cover reinforcement 400, and in particular the bumper cover support portions 410 of the bumper cover reinforcement 400 positioned adjacent to the bumper cover 45. As the bumper cover support portions 410 are coupled to the bumper reinforcement beam 40, downward movement of the bumper cover support portions 410 may be resisted by the bumper reinforcement beam 40.

When the force F' is applied to the bumper fascia 34 in the vehicle longitudinal direction, the bumper energy absorber member 42, and in particular the energy absorbing lobes 50 of the bumper energy absorber member 42 may selectively deform in the vehicle longitudinal direction. The bumper cover support portions 410 of the bumper cover support may similarly selectively deform in the vehicle longitudinal direction, absorbing energy associated with the impact. As described above, the outward extending portions 411 are tapered extending forward in the vehicle longitudinal direction such that the strength and/or stiffness of the bumper cover support portions 410 evaluated in the vehicle longitudinal direction that is less than the strength and/or stiffness of the bumper cover support portions 410 evaluated in the vehicle vertical direction. Further, the first bottom floor 432 and the second bottom floor 434 are positioned at an angle with respect to one another, which may cause the horizontally extending portion 414 to preferentially collapse and deform in the vehicle longitudinal direction.

Additionally, in some embodiments, the bumper cover support portions 410 include the reduced thickness regions 440 that reduce the strength and/or the stiffness of the bumper cover support portions 410 evaluated in the vehicle longitudinal direction. Accordingly, when the force F' is applied to the bumper cover support portions 410 through the bumper fascia 34, the bumper cover support portions 410 may selectively deform in the vehicle longitudinal direction in a manner that is similar to the bumper energy absorber member 42.

Further, when the force F' is applied to the bumper fascia 34, the bumper cover reinforcement 400 may selectively detach from the bumper reinforcement beam 40, such as when the bumper cover reinforcement 400 is coupled to the bumper reinforcement beam 40 with the releasable connection 84. By selectively detaching from the bumper reinforcement beam 40, the bumper cover reinforcement 400 may provide little or no resistance to the application of the force F' in the vehicle longitudinal direction to the bumper fascia 34. Accordingly, by selectively deforming in the vehicle longitudinal direction and/or detaching from the bumper reinforcement beam 40, the bumper cover reinforcement 400 may provide minimal resistance to the rearward movement of the bumper fascia 34 in addition to the resistance provided by the energy absorbing lobes 50 of the bumper energy absorber member 42. In this way, the bumper cover reinforcement 400 may not significantly affect the selective deformation of the bumper energy absorber member 42 upon the application of the force F' to the bumper fascia 34 in the vehicle longitudinal direction, such that front portion 16 of the vehicle 10 absorbs energy associated with the impact in accordance with pedestrian impact standards.

Figure 9A:
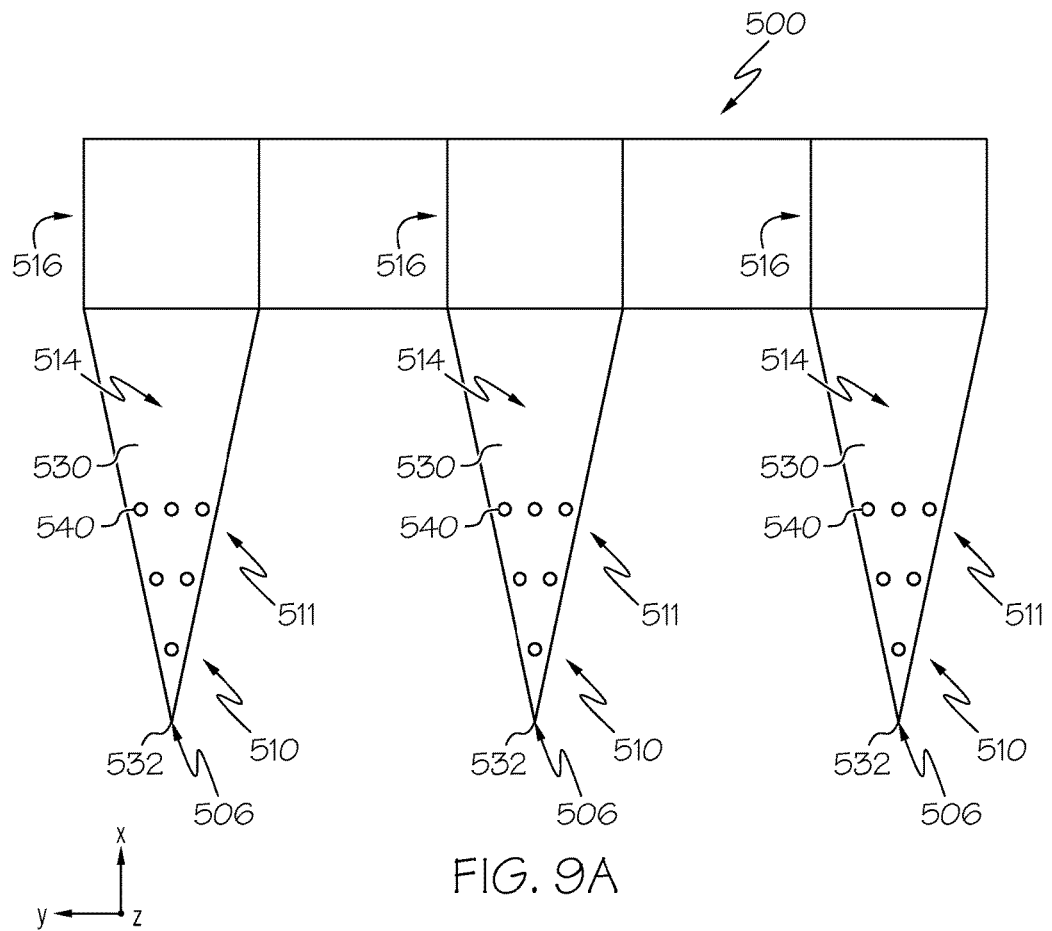
FIG. 9A schematically depicts a top view of another bumper cover reinforcement according to one or more embodiments shown or described herein.
Figure 9B:
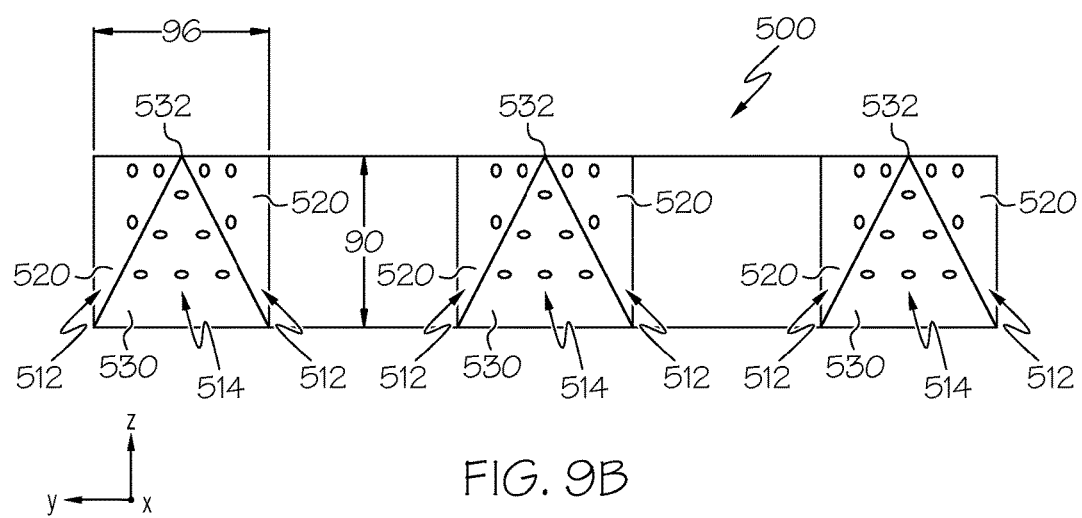
FIG. 9B schematically depicts a front view of the bumper cover reinforcement of FIG. 9A according to one or more embodiments shown or described herein.

Referring to FIGS. 9A and 9B, a top view and a front view of another embodiment of a bumper cover reinforcement 500 is depicted. Similar to the embodiment depicted in FIGS. 2-8B, the bumper cover reinforcement 500 includes a bumper cover support portion or bumper cover support portions 510 that includes an outward extending portion 511 that extends forward from the base portion 516 to an end 506 in the vehicle longitudinal direction. The outward extending portions 511 include a horizontally extending portion 514 that generally, although not necessarily exclusively, extends in a horizontal plane (i.e., in the X-Y plane as depicted), a vertically extending portion or vertically extending portions 512 that generally, although not necessarily exclusively, extend in a vertical plane (i.e., in the X-Z plane as depicted), and a base portion 516. In the embodiment shown in FIGS. 9A and 9B, the horizontally extending portion 514 and the vertically extending portions 512 extend to a point 532 at the end 506 of the bumper cover support portions 510.

The horizontally extending portion 514 includes a bottom floor 530 that extends in the vehicle longitudinal direction between the base portion 516 and the end 506. The vertically extending portions 512 of each of the outward extending portions 511 include a side wall or side walls 520 that extend upward from the bottom floor 530 in the vehicle vertical direction. In the embodiment shown in FIGS. 9A and 9B, each of the bumper cover support portions 510 include the pair of side walls 520 that are spaced apart from one another in the vehicle lateral direction and extend upward from the bottom floor 530, thereby giving each of the outward extending portions 511 a u-shaped cross-section or cup shape.

The bottom floor 530 extends upward in the vehicle vertical direction along a length of the bumper cover support portions 510 in the vehicle longitudinal direction from the base portion 516 to the end 506. In particular, the bottom floor 530 is positioned lower in the vehicle vertical direction where the bottom floor 530 meets the base portion 516 than at the position where the bottom floor 530 meets the end 506 of the bumper cover support portion 510. The pair of side walls 520 have a base height 90 evaluated in the vehicle vertical direction at the position where the pair of side walls 520 meet the base portion 516, and the pair of side walls 520 taper to the point 532 along a length of the bumper cover support portion 510, where the base height 90 is greater than the end height 92. The pair of side walls 520 are spaced apart from one another by a base width 96 in the vehicle lateral direction where the pair of side walls 520 meet the base portion 516, and the pair of side walls 520 taper inward to the point 532 at the end 506.

Accordingly, each of outward extending portions 511 are tapered extending forward in the vehicle longitudinal direction from the base portion 516, thereby decreasing in dimension in both the vehicle vertical direction and the vehicle lateral direction along a length of the bumper cover support portions 510 from the base portion 516 to the end 506. As a result of the tapered shape of the bumper cover support portions 510, the bumper cover support portions 510 may have a higher strength and/or stiffness evaluated in the vehicle vertical direction as compared to the strength and/or stiffness evaluated in the vehicle longitudinal direction.

In the embodiment depicted in FIGS. 9A and 9B, the bumper cover support portions 510 include one or more reduced thickness regions 540 positioned on the bottom floor 530 and/or the side walls 520 of the outward extending portions 511. In embodiments, the reduced thickness regions 540 may include through holes and/or slots through the bottom floor 530 and/or the side walls 520. The reduced thickness regions 540 may alternatively or additionally include regions of locally reduced material thickness in which the material thickness within the reduced thickness regions 540 is less than a material thickness of the bumper cover support portions 510 positioned outside the reduced thickness regions 540. In either instance, the reduced thickness regions 540 may reduce the strength and/or stiffness of the bumper cover support portions 510 evaluated in the vehicle longitudinal direction, such that the bumper cover support portions 510 preferentially deform in the vehicle longitudinal direction, as will be described in greater detail herein.

Referring back to FIG. 2, in operation, the bumper cover reinforcement 500 provides additional resistance to a downward force F applied to the bumper cover 45 in the vehicle vertical direction. Such a force F tends to cause downward deflection of the bumper cover 45, movement of which is resisted by the bumper cover reinforcement 500, and in particular the bumper cover support portions 510 of the bumper cover reinforcement 500 positioned adjacent to the bumper cover 45. As the bumper cover support portions 510 are coupled to the bumper reinforcement beam 40, downward movement of the bumper cover support portions 510 may be resisted by the bumper reinforcement beam 40.

When the force F' is applied to the bumper fascia 34 in the vehicle longitudinal direction, the bumper energy absorber member 42, and in particular the energy absorbing lobes 50 of the bumper energy absorber member 42 may selectively deform in the vehicle longitudinal direction. The bumper cover support portions 510 of the bumper cover support may similarly selectively deform in the vehicle longitudinal direction, absorbing energy associated with the impact. As described above, the outward extending portions 511 are tapered extending forward in the vehicle longitudinal direction such that the strength and/or stiffness of the bumper cover support portions 510 evaluated in the vehicle longitudinal direction that is less than the strength and/or stiffness of the bumper cover support portions 510 evaluated in the vehicle vertical direction.

Additionally, in some embodiments, the bumper cover support portions 510 include the reduced thickness regions 540 that reduce the strength and/or the stiffness of the bumper cover support portions 510 evaluated in the vehicle longitudinal direction. Accordingly, when the force F' is applied to the bumper cover support portions 510 through the bumper fascia 34, the bumper cover support portions 510 may selectively deform in the vehicle longitudinal direction in a manner that is similar to the bumper energy absorber member 42.

Further, when the force F' is applied to the bumper fascia 34, the bumper cover reinforcement 500 may selectively detach from the bumper reinforcement beam 40, such as when the bumper cover reinforcement 500 is coupled to the bumper reinforcement beam 40 with the releasable connection 84. By selectively detaching from the bumper reinforcement beam 40, the bumper cover reinforcement 500 may provide little or no resistance to the application of the force F' in the vehicle longitudinal direction to the bumper fascia 34. Accordingly, by selectively deforming in the vehicle longitudinal direction and/or detaching from the bumper reinforcement beam 40, the bumper cover reinforcement 500 may provide minimal resistance to the rearward movement of the bumper fascia 34 in addition to the resistance provided by the energy absorbing lobes 50 of the bumper energy absorber member 42. In this way, the bumper cover reinforcement 500 may not significantly affect the selective deformation of the bumper energy absorber member 42 upon the application of the force F' to the bumper fascia 34 in the vehicle longitudinal direction, such that front portion 16 of the vehicle 10 absorbs energy associated with the impact in accordance with pedestrian impact standards.

Figure 10A:
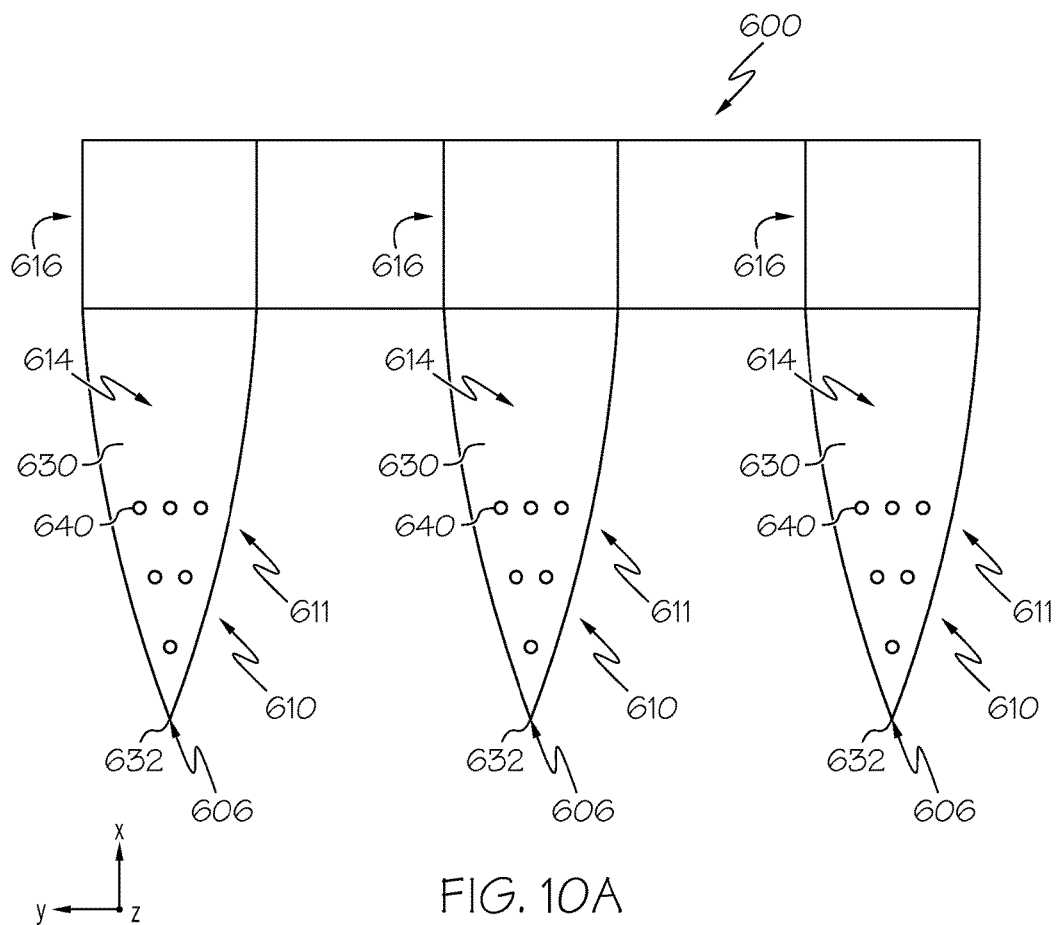
FIG. 10A schematically depicts a top view of another bumper cover reinforcement according to one or more embodiments shown or described herein.
Figure 10B:
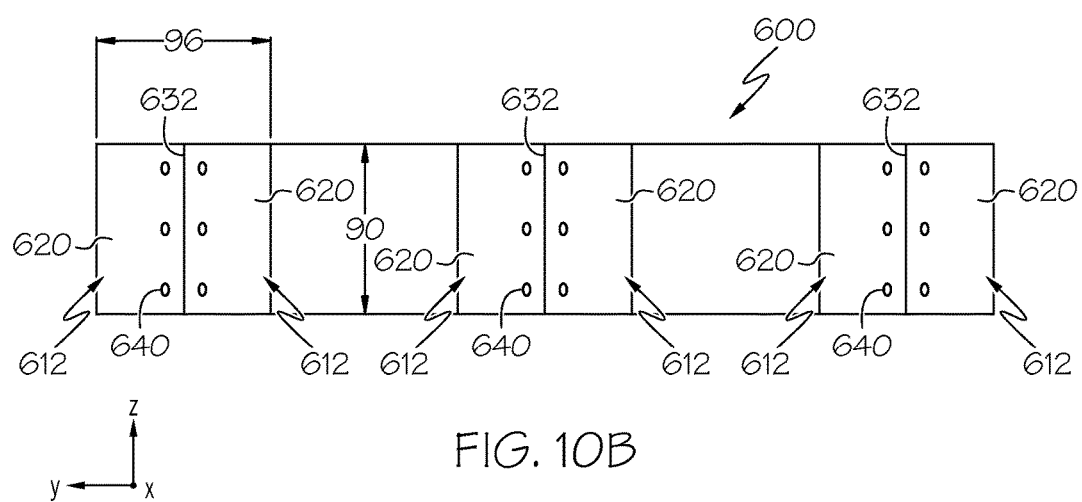
FIG. 10B schematically depicts a front view of the bumper cover reinforcement of FIG. 10A according to one or more embodiments shown or described herein.

Referring to FIGS. 10A and 10B, a top view and a front view of another embodiment of a bumper cover reinforcement 600 is depicted. Similar to the embodiment depicted in FIGS. 2-9B, the bumper cover reinforcement 600 includes a bumper cover support portion or bumper cover support portions 610 that include an outward extending portion 611 that extends forward from the base portion 616 to an end 606 in the vehicle longitudinal direction. The outward extending portions 611 include a horizontally extending portion 614 that generally extends in a horizontal plane (i.e., in the X-Y plane as depicted), a vertically extending portion or vertically extending portions 612 that generally extend in a vertical plane (i.e., in the X-Z plane as depicted), and a base portion 616. In the embodiment shown in FIGS. 9A and 9B, the horizontally extending portion 614 is generally planar extending forward from the base portion 616 in the vehicle longitudinal direction, and the vertically extending portions 612 and the horizontally extending portion 614 extend to a point 632 at the end 606.

The horizontally extending portion 614 includes a bottom floor 630 that extends in the vehicle longitudinal direction between the base portion 616 and the end 606. The vertically extending portions 612 of each of the outward extending portions 611 include a side wall or side walls 620 that extend upward from the bottom floor 630 in the vehicle vertical direction. In the embodiment shown in FIGS. 10A and 10B, each of the bumper cover support portions 610 include the pair of side walls 620 that are spaced apart from one another in the vehicle lateral direction and extend upward from the bottom floor 630, thereby giving each of the bumper cover support portions 610 a u-shaped cross-section or cup shape.

The pair of side walls 620 have a base height 90 evaluated in the vehicle vertical direction at the position where the pair of side walls 620 meet the base portion 616, and the base height 90 of the side walls 620 may be generally constant extending forward from the base portion 616 in the vehicle longitudinal direction. The pair of side walls 620 are spaced apart from one another by a base width 96 in the vehicle lateral direction where the pair of side walls 620 meet the base portion 616, and the pair of side walls 620 taper inward to the point 632 at the end 606 extending forward from the base portion 616 in the vehicle longitudinal direction.

Accordingly, each of the outward extending portions 611 are tapered extending forward in the vehicle longitudinal direction from the base portion 616, thereby decreasing in dimension in the vehicle lateral direction along a length of the bumper cover support portions 610 from the base portion 616 to the end 606. As a result of the tapered shape of the bumper cover support portions 610, the bumper cover support portions 610 may have a higher strength and/or stiffness evaluated in the vehicle vertical direction as compared to the strength and/or stiffness in the vehicle longitudinal direction.

In the embodiment depicted in FIGS. 10A and 10B, the bumper cover support portions 610 include one or more reduced thickness regions 640 positioned on the bottom floor 630 and/or the side walls 620 of the outward extending portions 611. In embodiments, the reduced thickness regions 640 may include through holes and/or slots through the bottom floor 630 and/or the side walls 620. The reduced thickness regions 640 may alternatively or additionally include regions of locally reduced material thickness in which the material thickness within the reduced thickness regions 640 is less than a material thickness of the bumper cover support portions 610 positioned outside the reduced thickness regions 640. In either instance, the reduced thickness regions 640 may reduce the strength and/or stiffness of the bumper cover support portions 610 evaluated in the vehicle longitudinal direction, such that the bumper cover support portions 610 preferentially deform in the vehicle longitudinal direction, as will be described in greater detail herein.

Referring back to FIG. 2, in operation, the bumper cover reinforcement 600 provides additional resistance to a downward force F applied to the bumper cover 45 in the vehicle vertical direction. Such a force F tends to cause downward deflection of the bumper cover 45, movement of which is resisted by the bumper cover reinforcement 600, and in particular the bumper cover support portions 610 of the bumper cover reinforcement 600 positioned adjacent to the bumper cover 45. As the bumper cover support portions 610 are coupled to the bumper reinforcement beam 40, downward movement of the bumper cover support portions 610 may be resisted by the bumper reinforcement beam 40.

When the force F' is applied to the bumper fascia 34 in the vehicle longitudinal direction, the bumper energy absorber member 42, and in particular the energy absorbing lobes 50 of the bumper energy absorber member 42 may selectively deform in the vehicle longitudinal direction. The bumper cover support portions 610 of the bumper cover support may similarly selectively deform in the vehicle longitudinal direction, absorbing energy associated with the impact. As described above, the outward extending portions 611 are tapered extending forward in the vehicle longitudinal direction such that the strength and/or stiffness of the bumper cover support portions 610 evaluated in the vehicle longitudinal direction that is less than the strength and/or stiffness of the bumper cover support portions 610 evaluated in the vehicle vertical direction.

Additionally, in some embodiments, the bumper cover support portions 610 include the reduced thickness regions 640 that reduce the strength and/or the stiffness of the bumper cover support portions 610 evaluated in the vehicle longitudinal direction. Accordingly, when the force F' is applied to the bumper cover support portions 610 through the bumper fascia 34, the bumper cover support portions 610 may selectively deform in the vehicle longitudinal direction in a manner that is similar to the bumper energy absorber member 42.

Further, when the force F' is applied to the bumper fascia 34, the bumper cover reinforcement 600 may selectively detach from the bumper reinforcement beam 40, such as when the bumper cover reinforcement 600 is coupled to the bumper reinforcement beam 40 with the releasable connection 84. By selectively detaching from the bumper reinforcement beam 40, the bumper cover reinforcement 600 may provide little or no resistance to the application of the force F' in the vehicle longitudinal direction to the bumper fascia 34. Accordingly, by selectively deforming in the vehicle longitudinal direction and/or detaching from the bumper reinforcement beam 40, the bumper cover reinforcement 600 may provide minimal resistance to the rearward movement of the bumper fascia 34 in addition to the resistance provided by the energy absorbing lobes 50 of the bumper energy absorber member 42. In this way, the bumper cover reinforcement 600 may not significantly affect the selective deformation of the bumper energy absorber member 42 upon the application of the force F' to the bumper fascia 34 in the vehicle longitudinal direction, such that front portion 16 of the vehicle 10 absorbs energy associated with the impact in accordance with pedestrian impact standards.

Figure 11A:
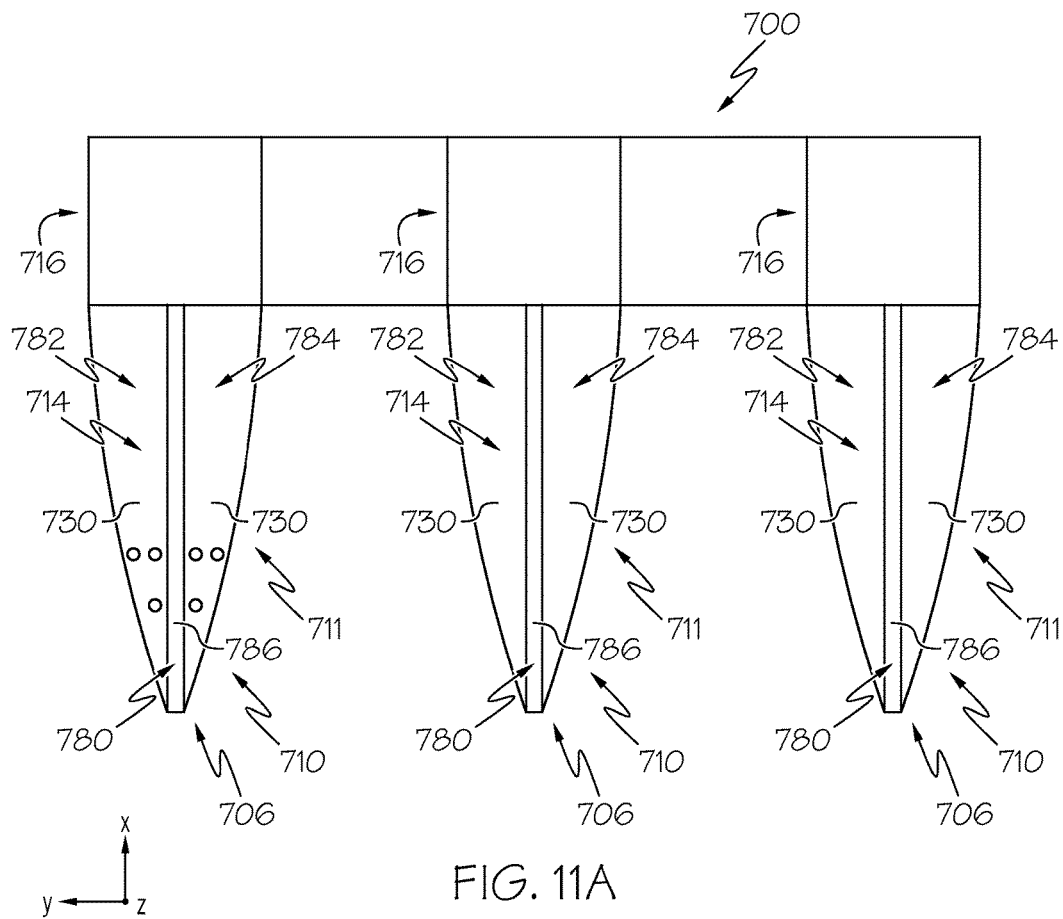
FIG. 11A schematically depicts a top view of another bumper cover reinforcement according to one or more embodiments shown or described herein.
Figure 11B:
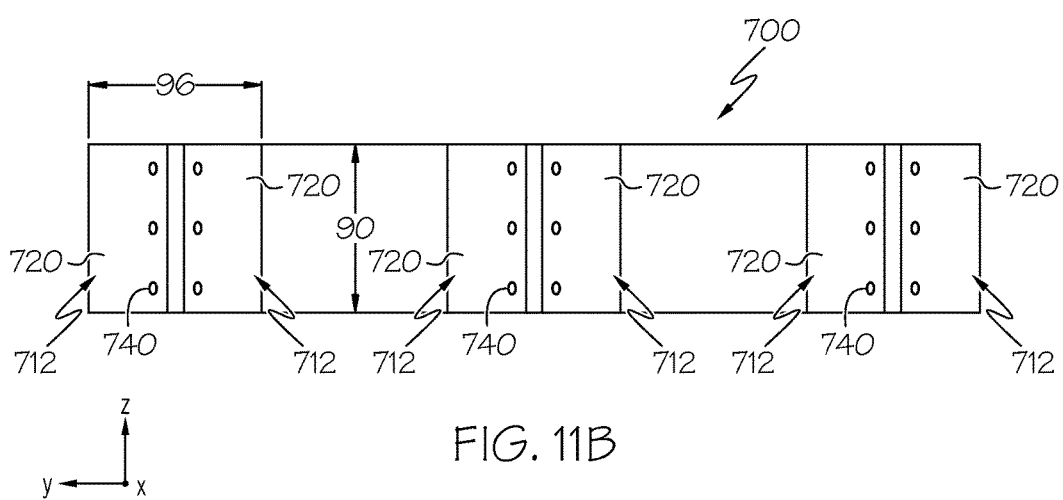
FIG. 11B schematically depicts a front view of the bumper cover reinforcement of FIG. 11A according to one or more embodiments shown or described herein.

Referring to FIGS. 11A and 11B, a top view and a front view of another embodiment of a bumper cover reinforcement 700 is depicted. Similar to the embodiment depicted in FIGS. 2-10B, the bumper cover reinforcement 700 includes a bumper cover support portion or bumper cover support portions 710 that includes an outward extending portion 711 that extends forward from the base portion 716 to an end 706 in the vehicle longitudinal direction. The outward extending portions 711 include a horizontally extending portion 714 that generally extends in a horizontal plane (i.e., in the X-Y plane as depicted), a vertically extending portion or vertically extending portions 712 that generally extend in a vertical plane (i.e., in the X-Z plane as depicted), and a base portion 716. In the embodiment shown in FIGS. 11A and 11B, each of the bumper cover support portions 710 include a central portion 780 that divides each of the bumper cover support portions 710 into a first support portion 782 and a second support portion 784.

The horizontally extending portion 714 includes a bottom floor 730 that extends in the vehicle longitudinal direction between the base portion 716 and the end 706. The vertically extending portions 712 of each of the outward extending portions 711 include a side wall or side walls 720 that extend upward from the bottom floor 730 in the vehicle vertical direction. In the embodiment shown in FIGS. 11A and 11B, each of the outward extending portions 711 include the pair of side walls 720 that are spaced apart from one another in the vehicle lateral direction and extend upward from the bottom floor 730, thereby giving each of the outward extending portions 711 a u-shaped cross-section or cup shape.

The pair of side walls 720 have a base height 90 evaluated in the vehicle vertical direction at the position where the pair of side walls 720 meet the base portion 716, and the base height 90 of the side walls 720 may be generally constant extending forward from the base portion 716 in the vehicle longitudinal direction. The pair of side walls 720 are spaced apart from one another by a base width 96 in the vehicle lateral direction where the pair of side walls 720 meet the base portion 716, and the pair of side walls 720 taper inward to the central portion 780 at the end 706 extending forward from the base portion 716 in the vehicle longitudinal direction.

Accordingly, each of the outward extending portions 711 are tapered extending forward in the vehicle longitudinal direction from the base portion 716, thereby decreasing in dimension in the vehicle lateral direction along a length of the bumper cover support portions 710 from the base portion 716 to the end 706. As a result of the tapered shape of the bumper cover support portions 710, the bumper cover support portions 710 may have a higher strength and/or stiffness evaluated in the vehicle vertical direction as compared to the vehicle longitudinal direction.

The central portion 780 of the bumper cover support portions 710 extends forward from the base portion 716 in the vehicle longitudinal direction to the end 706. In embodiments, the central portion 708 may include a central member 786 positioned between the first support portion 782 and the second support portion 784 in the vehicle lateral direction. The central member 786 may be coupled to the base portion 716, the horizontally extending portion 714, and/or the vertically extending portions 712 by any suitable method, including but not limited to, welded joints, brazed joints, mechanical fasteners, and structural adhesives. The central member 786 may be formed of any suitable material, such as plastic, metal, or composite, and be formed by any suitable method, such as molding, machining, etc. The central member 786 may increase the strength and/or stiffness of the bumper cover support portions 710 in the vehicle vertical direction as compared to bumper cover support portions 710 that do not include the central member 786. The central member 786 may also selectively deform in the vehicle longitudinal direction, as will be described in greater detail herein.

In some embodiments, the central portion 780 may define a gap positioned between the first support portion 782 and the second support portion 784 in the vehicle lateral direction. By defining a gap between the first support portion 782 and the second support portion 784, the central portion 780 may encourage selective deformation of the first support portion 782 and the second support portion 784 in the vehicle longitudinal direction.

In the embodiment depicted in FIGS. 11A and 11B, the bumper cover support portions 710 include one or more reduced thickness regions 740 positioned on the bottom floor 730 and/or the side walls 720 of the outward extending portions 711. In embodiments, the reduced thickness regions 740 may include through holes and/or slots through the bottom floor 730 and/or the side walls 720. The reduced thickness regions 740 may alternatively or additionally include regions of locally reduced material thickness in which the material thickness within the reduced thickness regions 740 is less than a material thickness of the bumper cover support portions 710 positioned outside the reduced thickness regions 740. In either instance, the reduced thickness regions 740 may reduce the strength and/or stiffness of the bumper cover support portions 710 evaluated in the vehicle longitudinal direction, such that the bumper cover support portions 710 preferentially deform in the vehicle longitudinal direction, as will be described in greater detail herein.

Referring back to FIG. 2, in operation, the bumper cover reinforcement 700 provides additional resistance to a downward force F applied to the bumper cover 45 in the vehicle vertical direction. Such a force F tends to cause downward deflection of the bumper cover 45, movement of which is resisted by the bumper cover reinforcement 700, and in particular the bumper cover support portions 710 of the bumper cover reinforcement 700 positioned adjacent to the bumper cover 45. As the bumper cover support portions 710 are coupled to the bumper reinforcement beam 40, downward movement of the bumper cover support portions 710 may be resisted by the bumper reinforcement beam 40. Further, in embodiments that include the central member 786, the central member increases the strength and/or stiffness of the bumper cover support portions 710 in the vehicle vertical direction as compared to bumper cover support portions 710 that do not include the central member 786. Accordingly, the central member 786 may further resist the downward force F applied to the bumper cover 45.

When the force F' is applied to the bumper fascia 34 in the vehicle longitudinal direction, the bumper energy absorber member 42, and in particular the energy absorbing lobes 50 of the bumper energy absorber member 42 may selectively deform in the vehicle longitudinal direction. The bumper cover support portions 710 of the bumper cover support may similarly selectively deform in the vehicle longitudinal direction, absorbing energy associated with the impact. As described above, the outward extending portions 711 are tapered extending forward in the vehicle longitudinal direction such that the strength and/or stiffness of the bumper cover support portions 710 evaluated in the vehicle longitudinal direction that is less than the strength and/or stiffness of the bumper cover support portions 710 evaluated in the vehicle vertical direction. Further in embodiments that include the central member 786, the central member 786 may selectively deform in the vehicle longitudinal direction. In embodiments that include the gap defined by the central portion 780, the gap may encourage the first support portion 782 and the second support portion 784 to selectively deform in the vehicle longitudinal direction.

Additionally, in some embodiments, the bumper cover support portions 710 include the reduced thickness regions 740 that reduce the strength and/or the stiffness of the bumper cover support portions 710 evaluated in the vehicle longitudinal direction. Accordingly, when the force F' is applied to the bumper cover support portions 710 through the bumper fascia 34, the bumper cover support portions 710 may selectively deform in the vehicle longitudinal direction in a manner that is similar to the bumper energy absorber member 42.

Further, when the force F' is applied to the bumper fascia 34, the bumper cover reinforcement 700 may selectively detach from the bumper reinforcement beam 40, such as when the bumper cover reinforcement 700 is coupled to the bumper reinforcement beam 40 with the releasable connection 84. By selectively detaching from the bumper reinforcement beam 40, the bumper cover reinforcement 700 may provide little or no resistance to the application of the force F' in the vehicle longitudinal direction to the bumper fascia 34. Accordingly, by selectively deforming in the vehicle longitudinal direction and/or detaching from the bumper reinforcement beam 40, the bumper cover reinforcement 700 may provide minimal resistance to the rearward movement of the bumper fascia 34 in addition to the resistance provided by the energy absorbing lobes 50 of the bumper energy absorber member 42. In this way, the bumper cover reinforcement 700 may not significantly affect the selective deformation of the bumper energy absorber member 42 upon the application of the force F' to the bumper fascia 34 in the vehicle longitudinal direction, such that front portion 16 of the vehicle 10 absorbs energy associated with the impact in accordance with pedestrian impact standards.

Figure 12A:
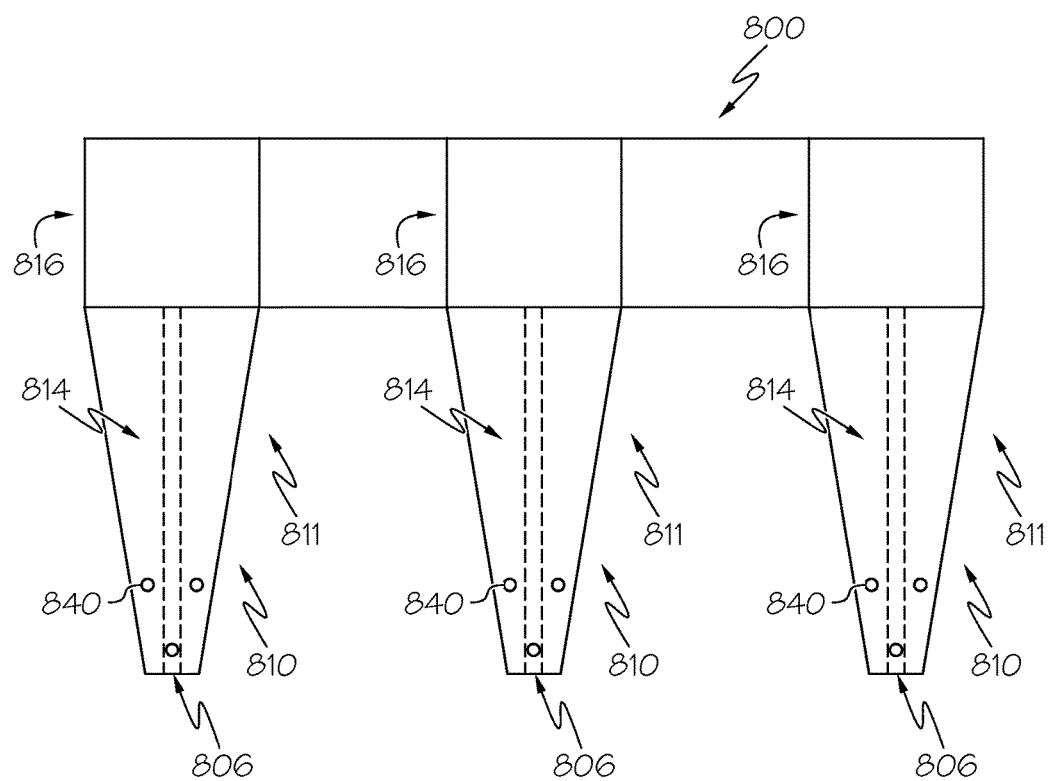
FIG. 12A schematically depicts a top view of another bumper cover reinforcement according to one or more embodiments shown or described herein.
Figure 12B:
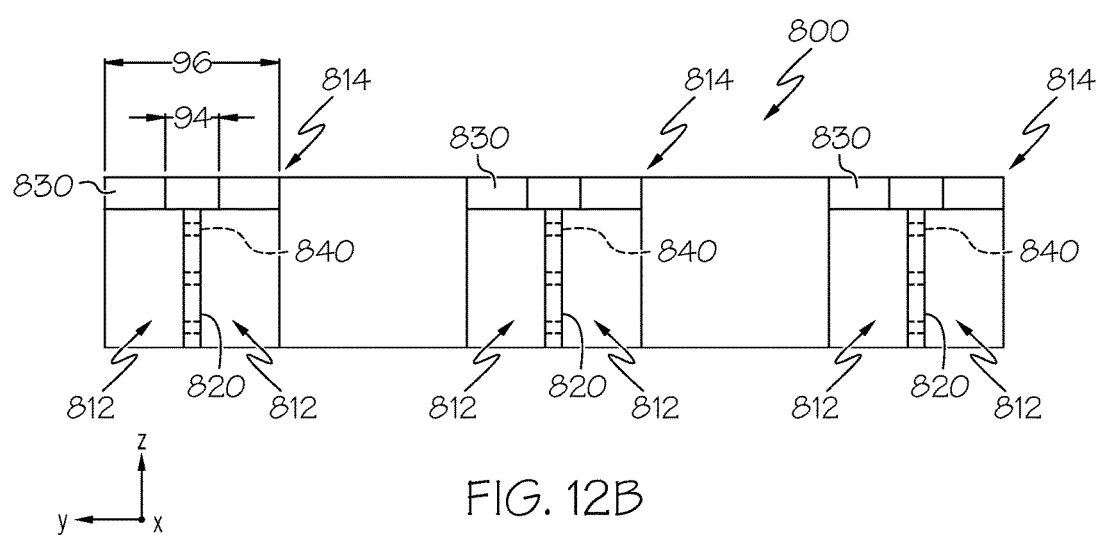
FIG. 12B schematically depicts a front view of the bumper cover reinforcement of FIG. 12A according to one or more embodiments shown or described herein.
Figure 12C:
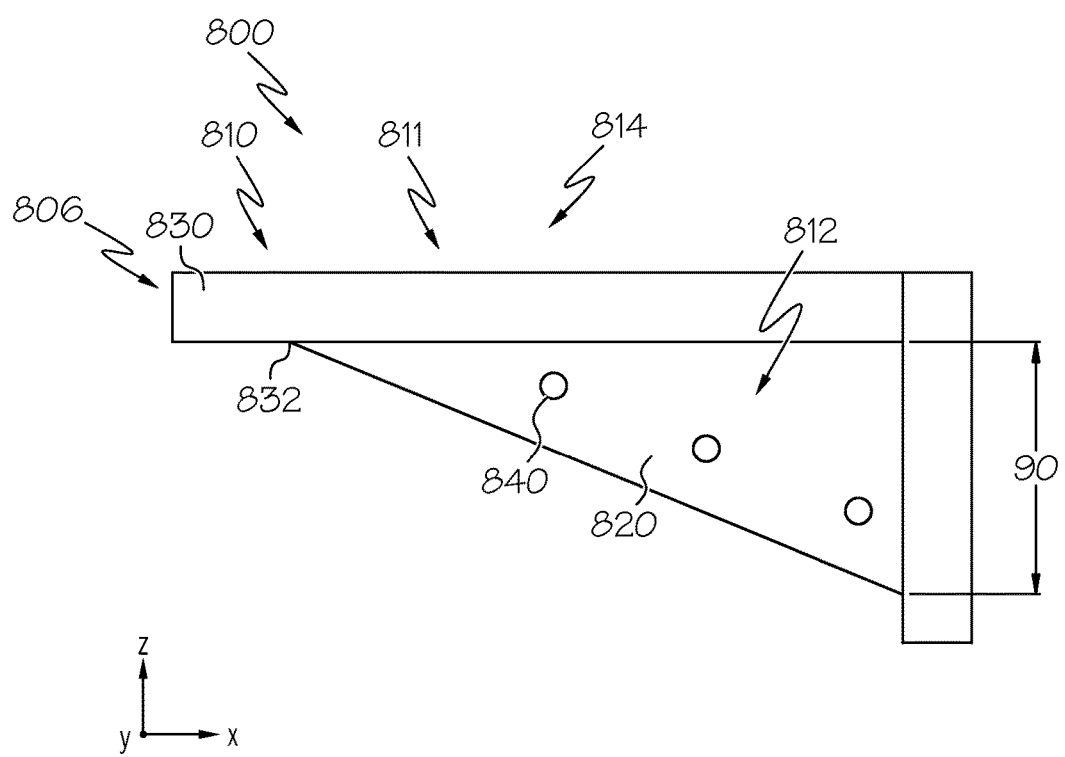
FIG. 12C schematically depicts a side view of the bumper cover reinforcement of FIG. 12A according to one or more embodiments shown or described herein.

Referring to FIGS. 12A, 12B, and 12C, a top view, a front view, and a side view of another embodiment of a bumper cover reinforcement 800 is depicted. Similar to the embodiment depicted in FIGS. 2-11B, the bumper cover reinforcement 800 includes a bumper cover support portion or bumper cover support portions 810 that includes an outward extending portion 811 that extends forward from the base portion 816 to an end 806 in the vehicle longitudinal direction. The outward extending portions 811 include a horizontally extending portion 814 that generally extends in a horizontal plane (i.e., in the X-Y plane as depicted), a vertically extending portion or vertically extending portions 812 that generally extend in a vertical plane (i.e., in the X-Z plane as depicted), and a base portion 716. In the embodiment shown in FIGS. 12A-12C, the horizontally extending portion 814 is positioned above the vertically extending portion 812.

The horizontally extending portion 814 includes a top face 830 that extends in the vehicle longitudinal direction between the base portion 816 and the end 806. The vertically extending portion 812 of each of the outward extending portions 811 includes a central portion 820 that extends downward from the top face 830 in the vehicle vertical direction. In the embodiment shown in FIGS. 12A and 12B, each of the outward extending portions 811 include the central portion 820 that is positioned beneath the top face 830 in the vehicle vertical direction and is centrally positioned with respect to the top face 830 in the vehicle lateral direction, thereby giving each of the outward extending portions 811 a T-shaped cross-section The central portion 820 has a base height 90 evaluated in the vehicle vertical direction at the position where the central portion 820 meets the base portion 816, and the central portion 820 tapers to a point 832 at the end 806. The top face 830 has a base width 96 in the vehicle lateral direction where the top face 830 meets the base portion 816, and the top face 830 has a end width 94 evaluated in the vehicle lateral direction at the end 806, where the end width 94 is less than the base width 96.

Accordingly, each of the bumper cover support portions 810 are tapered extending forward in the vehicle longitudinal direction from the base portion 816, thereby decreasing in dimension in both the vehicle lateral direction and the vehicle vertical direction along a length of the bumper cover support portions 810 from the base portion 816 to the end 806. As a result of the tapered shape of the bumper cover support portions 810, the bumper cover support portions 810 may have a higher strength and/or stiffness evaluated in the vehicle vertical direction as compared to the strength and/or stiffness evaluated in the vehicle longitudinal direction.

In the embodiment depicted in FIGS. 12A-12C, the bumper cover support portions 810 include one or more reduced thickness regions 840 positioned on the top face 830 and/or the central portion 820 of the outward extending portions 811. In embodiments, the reduced thickness regions 840 may include through holes and/or slots through the top face 830 and/or central portion 820. The reduced thickness regions 840 may alternatively or additionally include regions of locally reduced material thickness in which the material thickness within the reduced thickness regions 840 is less than a material thickness of the bumper cover support portions 810 positioned outside the reduced thickness regions 840. In either instance, the reduced thickness regions 840 may reduce the strength and/or stiffness of the bumper cover support portions 810 evaluated in the vehicle longitudinal direction, such that the bumper cover support portions 810 preferentially deform in the vehicle longitudinal direction, as will be described in greater detail herein.

Referring back to FIG. 2, in operation, the bumper cover reinforcement 800 provides additional resistance to a downward force F applied to the bumper cover 45 in the vehicle vertical direction. Such a force F tends to cause downward deflection of the bumper cover 45, movement of which is resisted by the bumper cover reinforcement 800, and in particular the bumper cover support portions 810 of the bumper cover reinforcement 800 positioned adjacent to the bumper cover 45. As the bumper cover support portions 810 are coupled to the bumper reinforcement beam 40, downward movement of the bumper cover support portions 810 may be resisted by the bumper reinforcement beam 40.

When the force F' is applied to the bumper fascia 34 in the vehicle longitudinal direction, the bumper energy absorber member 42, and in particular the energy absorbing lobes 50 of the bumper energy absorber member 42 may selectively deform in the vehicle longitudinal direction. The bumper cover support portions 810 of the bumper cover support may similarly selectively deform in the vehicle longitudinal direction, absorbing energy associated with the impact. As described above, the outward extending portions 811 are tapered extending forward in the vehicle longitudinal direction such that the strength and/or stiffness of the bumper cover support portions 810 evaluated in the vehicle longitudinal direction that is less than the strength and/or stiffness of the bumper cover support portions 810 evaluated in the vehicle vertical direction. Additionally, in some embodiments, the bumper cover support portions 810 include the reduced thickness regions 840 that reduce the strength and/or the stiffness of the bumper cover support portions 810 evaluated in the vehicle longitudinal direction. Accordingly, when the force F' is applied to the bumper cover support portions 810 through the bumper fascia 34, the bumper cover support portions 810 may selectively deform in the vehicle longitudinal direction in a manner that is similar to the bumper energy absorber member 42.

Further, when the force F' is applied to the bumper fascia 34, the bumper cover reinforcement 800 may selectively detach from the bumper reinforcement beam 40, such as when the bumper cover reinforcement 800 is coupled to the bumper reinforcement beam 40 with the releasable connection 84. By selectively detaching from the bumper reinforcement beam 40, the bumper cover reinforcement 800 may provide little or no resistance to the application of the force F' in the vehicle longitudinal direction to the bumper fascia 34. Accordingly, by selectively deforming in the vehicle longitudinal direction and/or detaching from the bumper reinforcement beam 40, the bumper cover reinforcement 800 may provide minimal resistance to the rearward movement of the bumper fascia 34 in addition to the resistance provided by the energy absorbing lobes 50 of the bumper energy absorber member 42. In this way, the bumper cover reinforcement 800 may not significantly affect the selective deformation of the bumper energy absorber member 42 upon the application of the force F' to the bumper fascia 34 in the vehicle longitudinal direction, such that front portion 16 of the vehicle 10 absorbs energy associated with the impact in accordance with pedestrian impact standards.

It should now be understood, the above-described bumper cover reinforcements can provide a bumper cover that is reinforced in a vehicle vertical direction against a bumper reinforcement beam. The bumper assembly includes a bumper cover reinforcement that extends forward of the bumper reinforcement beam and toward the bumper cover that limits movement of the bumper cover in response to a downward vertical force, which can improve static subjective rigidity of the bumper cover. The bumper cover reinforcement also selectively deforms and may disengage from the bumper reinforcement beam in response to a vehicle longitudinal force, which can maintain pedestrian performance of the bumper assembly.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A bumper assembly comprising:
    a bumper reinforcement beam that extends in a vehicle lateral direction;
    a bumper cover positioned above the bumper reinforcement beam in a vehicle vertical direction; and
    a bumper cover reinforcement coupled to the bumper reinforcement beam, the bumper cover reinforcement comprising a bumper cover support portion comprising:
        a base portion coupled to the bumper reinforcement beam; and
        an outward extending portion extending outward from the base portion in a vehicle longitudinal direction to an end, the outward extending portion comprising a horizontally extending portion and a vertically extending portion extending in the vehicle vertical direction from the horizontally extending portion, wherein at least one of the horizontally extending portion decreases in dimension in the vehicle lateral direction along a length of the bumper cover support portion from the base portion to the end and the vertically extending portion decreases in dimension in the vehicle vertical direction along the length of the bumper cover support portion from the base portion to the end;
        wherein the base portion is integral with an anchor portion which is coupled to the bumper reinforcement beam by a releasable connection.

2. The bumper assembly of claim 1, wherein the horizontally extending portion and the vertically extending portion extend to a point at the end of the bumper cover support portion.

3. The bumper assembly of claim 1, wherein the horizontally extending portion comprises a first bottom floor and a second bottom floor, wherein the first bottom floor and the second bottom floor are positioned at an angle with respect to one another.

4. The bumper assembly of claim 1, wherein the bumper cover support portion comprises a central portion that divides the bumper cover support portion into a first support portion and a second support portion.

5. The bumper assembly of claim 1, wherein the horizontally extending portion comprises a top face and the vertically extending portion comprises a central portion that extends downward from the top face.

6. The bumper assembly of claim 5, wherein at least one of the top face and the central portion comprise a reduced thickness region.

7. The bumper assembly of claim 5, wherein the horizontally extending portion has a base width in the vehicle lateral direction at the base portion of the bumper cover support portion and an end width at the end of the bumper cover support portion, wherein the base width is greater than the end width.

8. The bumper assembly of claim 1, wherein the horizontally extending portion comprises a bottom floor and the vertically extending portion comprises side walls extending upward from the bottom floor.

9. The bumper assembly of claim 8, wherein at least one of the bottom floor or the side walls comprise a reduced thickness region.

10. The bumper assembly of claim 8, wherein the bottom floor is generally planar extending forward from the base portion to the end of the bumper cover support portion in the vehicle longitudinal direction.

11. The bumper assembly of claim 8, wherein the side walls are spaced apart from one another by a base width in the vehicle lateral direction at the base portion and the side walls are spaced apart from one another by an end width at the end, wherein the base width is greater than the end width.

12. The bumper assembly of claim 8, wherein the side walls extend forward of the bottom floor in the vehicle longitudinal direction.

13. The bumper assembly of claim 8, wherein the bottom floor of the bumper cover support portion extends upward in the vehicle vertical direction along the length of the bumper cover support portion extending from the base portion to the end in the vehicle longitudinal direction.

14. The bumper assembly of claim 13, wherein the bottom floor extends upward in the vehicle vertical direction along an arc.

15. A vehicle comprising:
   a bumper reinforcement beam that extends in a vehicle lateral direction;
   a bumper energy absorber member coupled to a face of the bumper reinforcement beam, the bumper energy absorber member comprising a base that extends laterally along a length of the bumper reinforcement beam and energy absorbing lobes that extend outward from the base in a vehicle longitudinal direction;
   a bumper cover positioned above the bumper reinforcement beam in a vehicle vertical direction; and
   a bumper cover reinforcement coupled to the bumper reinforcement beam, the bumper cover reinforcement comprising a bumper cover support portion comprising:
      a base portion coupled to the bumper reinforcement beam;
      an outward extending portion extending outward of the base portion in the vehicle longitudinal direction to an end, wherein the outward extending portion comprises a horizontally extending portion and a vertically extending portion extending from the horizontally extending portion in the vehicle vertical direction, and wherein the bumper cover support portion resists a downward force applied to the bumper cover in the vehicle vertical direction; and
      an anchor portion connected to the base portion, the anchor portion extending rearward in the vehicle longitudinal direction over a top face and rear corner of the bumper reinforcement beam.

16. The vehicle of claim 15, wherein at least one of the horizontally extending portion and the vertically extending portion comprise a reduced thickness region.

17. The vehicle of claim 15, wherein the horizontally extending portion comprises a top face and the vertically extending portion comprises a central portion extending downward from the top face.

18. The vehicle of claim 15, wherein the base portion is integral with the anchor portion which is coupled to the bumper reinforcement beam by a releasable connection.

19. The vehicle of claim 15, wherein the horizontally extending portion comprises a bottom floor and the vertically extending portion comprises side walls extending upward from the bottom floor in the vehicle vertical direction, wherein the side walls are spaced apart from one another in the vehicle lateral direction.

20. The vehicle of claim 19, wherein the side walls have a base height at the base portion evaluated in the vehicle vertical direction and an end height evaluated in the vehicle vertical direction at the end of the bumper cover support portion, wherein the base height is greater than the end height.

* * * * *